United States Patent
Cho et al.

(10) Patent No.: US 9,411,459 B2
(45) Date of Patent: Aug. 9, 2016

(54) MOBILE TERMINAL AND CONTROL METHOD THEREOF

(75) Inventors: Sunghyun Cho, Seoul (KR); Kyungmin Lee, Seoul (KR); Joonho Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1136 days.

(21) Appl. No.: 12/972,173

(22) Filed: Dec. 17, 2010

(65) Prior Publication Data

US 2011/0285645 A1 Nov. 24, 2011

(30) Foreign Application Priority Data

May 19, 2010 (KR) .................. 10-2010-0047124
May 19, 2010 (KR) .................. 10-2010-0047125

(51) Int. Cl.
*G06F 3/041* (2006.01)
*G06F 3/01* (2006.01)

(52) U.S. Cl.
CPC .................... *G06F 3/0416* (2013.01)

(58) Field of Classification Search
CPC .............. G06F 3/04886; G06F 2203/04803; G06F 2203/04809; G06F 3/041; G06F 3/0416
USPC .............................. 345/173–178
See application file for complete search history.

(56) References Cited

U.S. PATENT DOCUMENTS

| 2009/0091542 A1* | 4/2009 | Inaba et al. ................ 345/173 |
| 2009/0174679 A1 | 7/2009 | Westerman |
| 2009/0184935 A1* | 7/2009 | Kim ............................ 345/173 |
| 2010/0162109 A1* | 6/2010 | Chatterjee et al. ........... 715/702 |

FOREIGN PATENT DOCUMENTS

| KR | 10-2008-0019266 A | 3/2008 |
| KR | 10-2009-0079405 A | 7/2009 |

* cited by examiner

*Primary Examiner* — Amit Chatly
(74) *Attorney, Agent, or Firm* — Birch, Stewart, Kolasch & Birch, LLP

(57) ABSTRACT

A mobile terminal in which a touch input is automatically recognized as a touch by a user's grip on a display unit having a touch screen when a partial region of the display unit is touched by the user's grip, and a control method thereof are discussed. The control method of a mobile terminal includes generating, by the mobile terminal, a first signal corresponding to a first touch input on a display region of a display unit of the mobile terminal, calculating, by the mobile terminal, a first coordinate value corresponding to the generated first signal, determining, by the mobile terminal, whether or not the first coordinate value is located within a first preset region of the display region, and reconfiguring, by the mobile terminal, the display region of the display unit based on the calculated first coordinate value when the calculated first coordinate value is determined to be located within the first preset region.

10 Claims, 16 Drawing Sheets

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2010-0047124 and 10-2010-0047125 filed on May 19, 2010, the contents of which are incorporated by reference herein in its entirety.

BACKGROUND OF THE INVENTION

1. Field of the Invention

Some exemplary embodiments of the present disclosure relate to a mobile terminal and a control method thereof.

2. Background of the Invention

Generally, a mobile terminal indicates an apparatus capable of performing a Global Positioning System (GPS) function and a communication function (or call function), and capable of providing a performance result to a user.

SUMMARY OF THE INVENTION

According to one aspect of the present disclosure, there is provided a control method of a mobile terminal, comprising: receiving a first signal generated by a first touch input on a display region of a display unit; calculating a first coordinate value corresponding to the received first signal; and reconfiguring the display region of the display unit based on the calculated first coordinate value when the calculated first coordinate value is located within a preset region.

According to another aspect of the present disclosure, there is provided further comprising: detecting a touch time for the first touch input; and reconfiguring the display region of the display unit based on the calculated first coordinate value when the calculated first coordinate value is located within the preset region and the detected touch time exceeds a preset time.

According to another aspect of the present disclosure, there is provided the reconfiguring the display region comprises: configuring a non-effective region including the calculated first coordinate value in the display region based on the calculated first coordinate value; and configuring the remaining region excluding the non-effective region in the display region as an effective region;

According to another aspect of the present disclosure, there is provided the reconfiguring the display region comprises: selecting at least one adjacent side adjacent to the calculated first coordinate value from a plurality of sides included in the display region based on the calculated first coordinate value; configuring a partial region of the selected adjacent side as a non-effective region; and configuring the remaining region excluding the non-effective region in the display region as an effective region.

According to another aspect of the present disclosure, there is provided the reconfiguring the display region comprises: configuring a first region including the calculated first coordinate value in the display region based on the calculated first coordinate value; and configuring the remaining region excluding the first region in the display region as a new display region.

According to another aspect of the present disclosure, there is provided the reconfiguring the display region comprises: selecting at least one adjacent side adjacent to the calculated first coordinate value from a plurality of sides included in the display region based on the calculated first coordinate value and configuring a partial region of the selected adjacent side; and configuring the remaining region excluding the partial region in the display region as a new display region.

According to another aspect of the present disclosure, there is provided a mobile terminal, comprising: a display unit configured to receive a first signal generated by a first touch input on a display region; and a controller configured to calculate a first coordinate value corresponding to the received first signal, and reconfigure the display region of the display unit based on the calculated first coordinate value when the calculated first coordinate value is located within a preset region.

According to another aspect of the present disclosure, there is provided the mobile terminal further comprising: a sensor unit configured to detect a touch time for the first touch input.

According to another aspect of the present disclosure, there is provided the controller reconfigures the display region of the display unit based on the calculated first coordinate value when the calculated first coordinate value is located within the preset region and the detected touch time exceeds a preset time.

According to another aspect of the present disclosure, there is provided a control method of a mobile terminal, comprising: detecting a first touch input by at least one sensor module from a plurality of sensor modules included in a sensor unit, and outputting a first signal corresponding to the detected first touch input; receiving a second signal generated by a second touch input on a display region of a display unit; calculating a first coordinate value and a second coordinate value corresponding to the first signal and the second signal; and reconfiguring the display region of the display unit when a distance between the calculated first coordinate value and the second coordinate value is less than a preset threshold value.

According to another aspect of the present disclosure, there is provided the reconfiguring the display region comprises: configuring a non-effective region including a first region including the calculated first coordinate value and/or a second region including the calculated second coordinate value in the display region; and configuring the remaining region excluding the non-effective region in the display region as an effective region.

According to another aspect of the present disclosure, there is provided the reconfiguring the display region comprises: selecting one or more adjacent sides adjacent to the calculated first coordinate value and/or second coordinate value from a plurality of sides included in the display region; configuring a partial region of the selected one or more adjacent sides as a non-effective region; and configuring the remaining region excluding the configured non-effective region in the display region as an effective region.

According to another aspect of the present disclosure, there is provided the reconfiguring the display region comprises: configuring a first region including the calculated first coordinate value in the display region; configuring a second region including the calculated second coordinate value in the display region; and configuring the remaining region excluding the first region and/or the second region in the display region as a new display region.

According to another aspect of the present disclosure, there is provided the reconfiguring the display region comprises: selecting one or more adjacent sides adjacent to the calculated first coordinate value and/or second coordinate value from a plurality of sides included in the display region and configuring a partial region of the selected one or more adjacent sides; and configuring the remaining region excluding the partial region of the one or more adjacent sides in the display region as a new display region.

According to another aspect of the present disclosure, there is provided a mobile terminal, comprising: a sensor unit configured to detect a first touch input by at least one sensor module from a plurality of sensor modules, and output a first signal corresponding to the detected first touch input; a display unit configured to receive a second signal generated by a second touch input on a display region; and a controller configured to calculate a first coordinate value and a second coordinate value corresponding to the first signal and the second signal, and reconfigure the display region of the display unit when a distance between the calculated first coordinate value and the second coordinate value is less than a preset threshold value.

According to another aspect of the present disclosure, there is provided a control method of a mobile terminal, comprising: configuring a display region of a display unit as a first effective region and a first non-effective region based on a first coordinate value calculated corresponding to a first touch input; and reconfiguring the first effective region and the first non-effective region based on the detected motion of the mobile terminal when the motion of the mobile terminal is detected by a sensor unit.

According to another aspect of the present disclosure, there is provided the reconfiguring the first effective region and the first non-effective region comprises: configuring a second non-effective region by adding a preset weight to the first non-effective region in the display region based on the detected motion of the mobile terminal; and configuring the remaining region excluding the second non-effective region in the display region as a second effective region.

According to another aspect of the present disclosure, there is provided a mobile terminal, comprising: a sensor unit configured to detect a motion of the mobile terminal; and a controller configured to reconfigure a first effective region and a first non-effective region preset on the display region of the display unit based on the detected motion of the mobile terminal when the motion of the mobile terminal is detected by the sensor unit.

According to another aspect of the present disclosure, there is provided the controller configures a second non-effective region by adding a preset weight to the first non-effective region in the display region based on the detected motion of the mobile terminal, and configures the remaining region excluding the second non-effective region in the display region as a second effective region.

According to another aspect of the present disclosure, there is provided a control method of a mobile terminal, comprising: receiving a plurality of signals generated by a plurality of sequential touch inputs in a display region of a display unit; determining whether the plurality of received signals are a touch by a grip based on the plurality of received signals; and terminating any functional execution corresponding to the plurality of received signals when the plurality of received signals are a touch by a grip.

According to another aspect of the present disclosure, there is provided the determining whether the plurality of received signals are a touch by a grip comprises: calculating a plurality of coordinate values corresponding to the plurality of received signals; and checking whether the plurality of calculated coordinate values correspond to predefined location information.

According to another aspect of the present disclosure, there is provided a mobile terminal, comprising: a display unit configured to receive a plurality of signals generated by a plurality of sequential touch inputs in a display region; and a controller configured to terminate any functional execution corresponding to the plurality of received signals when the controller determines that the plurality of received signals are a touch by a grip.

According to another aspect of the present disclosure, there is a mobile terminal and corresponding control method, the method including: generating, by the mobile terminal, a first signal corresponding to a first touch input on a display region of a display unit of the mobile terminal; calculating, by the mobile terminal, a first coordinate value corresponding to the generated first signal; determining, by the mobile terminal, whether or not the first coordinate value is located within a first preset region of the display region; and reconfiguring, by the mobile terminal, the display region of the display unit based on the calculated first coordinate value when the calculated first coordinate value is determined to be located within the preset region.

According to another aspect of the present disclosure, there is a mobile terminal and corresponding control method, the method including: detecting a first touch input by at least one of a plurality of sensor modules included in a sensor unit of the mobile terminal, and outputting a first signal corresponding to the detected first touch input; detecting a second touch input on a display region of a display unit of the mobile terminal, and outputting a second signal corresponding to the detected second touch input; calculating, by the mobile terminal, a first coordinate value and a second coordinate value corresponding to the first signal and the second signal; and reconfiguring, by the mobile terminal, the display region of the display unit when a distance between the calculated first coordinate value and the calculated second coordinate value is less than a preset threshold value.

According to another aspect of the present disclosure, there is a mobile terminal and corresponding control method, the method including: generating a plurality of signals corresponding to a plurality of sequential touch inputs in a display region of a display unit of the mobile terminal; determining, by the mobile terminal based on the plurality of received signals, whether or not the plurality of generated signals correspond to a grip applied to the mobile terminal; and terminating, by the mobile terminal, an execution of any function corresponding to the plurality of generated signals when the plurality of generated signals are determined to correspond to the grip applied to the mobile terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the preferred embodiments according to the present invention, with reference to the accompanying drawings. For the sake of brief description with reference to the drawings, the same or equivalent components will be provided with the same reference numbers, and description thereof will not be repeated.

Figure 1:
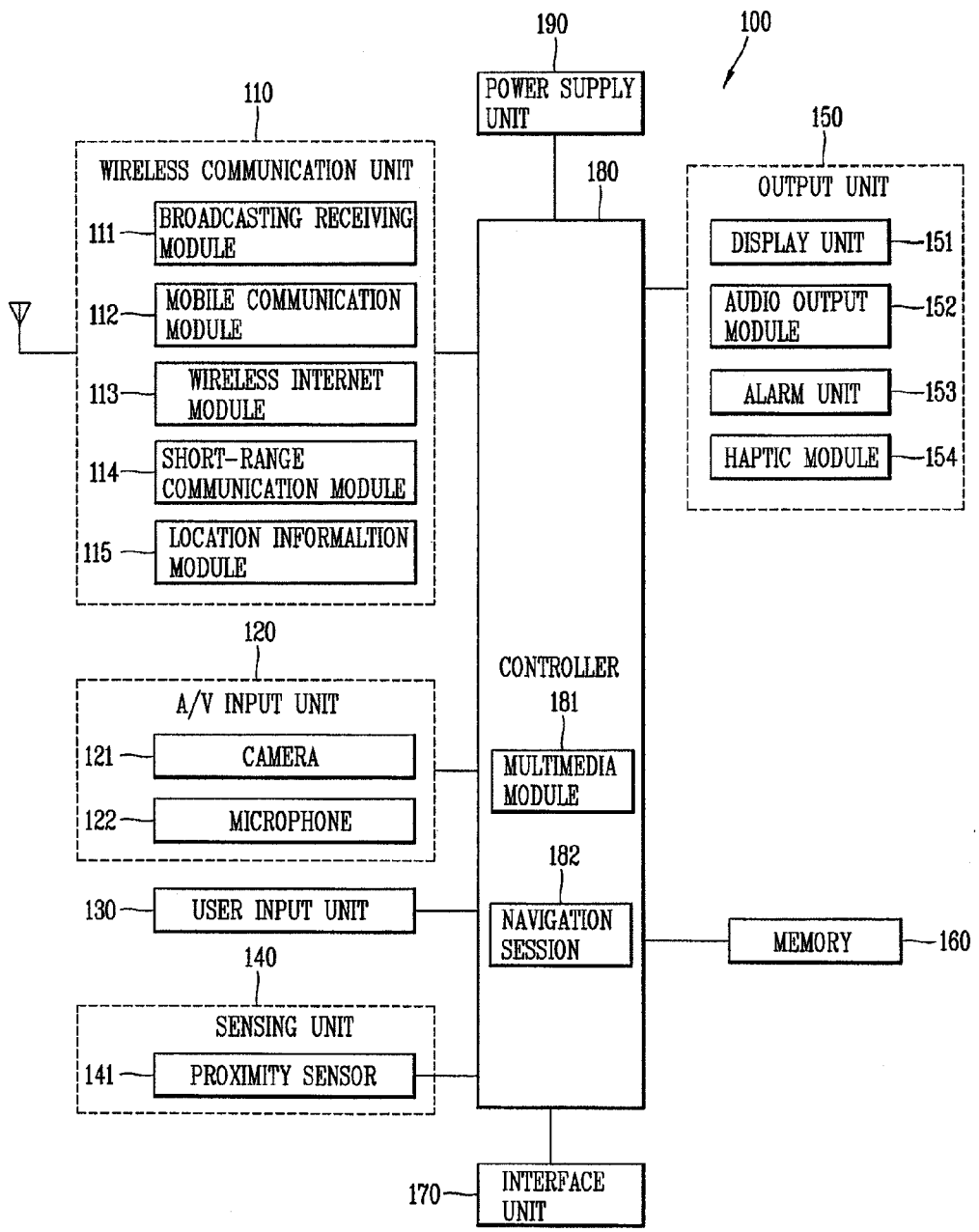
FIG. 1 is a block diagram showing a configuration of a mobile terminal for explaining a mobile terminal in accordance with one embodiment of the present invention.

FIG. 1 is a block diagram showing a configuration of a mobile terminal for explaining a mobile terminal 100 in accordance with one embodiment of the present invention. The mobile terminal 100 may be implemented in various forms such as mobile phones, smart phones, notebook computers, digital broadcast terminals, PDAs (Personal Digital Assistants), PMPs (Portable Multimedia Player), navigation systems, etc.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, a location information module 115, etc.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, the broadcast signal may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may include a GPS (Global positioning system) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151. The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data to control an operation of the mobile terminal 100. The user input unit 130 may include a keypad, a dome switch, a touch pad (pressure/capacitance), a jog wheel, a jog switch, and the like. Particularly, when the touch pad forms an interlayer structure together with a display unit 151, the combined device may be called a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units 151 according to an implementation method thereof. For example, the mobile terminal 100 may include a plurality of display units integrally or separately disposed on one surface, or a plurality of display units disposed on different surfaces.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may have, for example, the form of a touch film, a touch sheet, a touch pad, and the like. The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and proximity sensor 141 can be utilized for various purposes. An example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of the proximity touch, the pointer is located to correspond vertically to the touch screen. The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, etc.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted. Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat. The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store programs used for the processing and controlling operations performed by the controller 180, or may temporarily store data (e.g., a phonebook, messages, still images, video, etc.) that is inputted or outputted. The memory 160 may store data relating to various types of vibrations and sounds outputted when touch input is performed on the touch screen. The memory 160 may include at least one type of non-transitory storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180. A navigation session 300 applied to the mobile terminal 100 provides a general navigation function.

The controller 180 applied to the mobile terminal 100 according to an embodiment of the present invention automatically recognizes a touch input as a touch by a user's grip and reconfigures a display region of the display unit based on the touch input if a partial region of the display unit is touched by the user's grip on the display unit having a touch screen, thereby preventing an error of the mobile terminal due to a wrong touch such as the user's grip, and the like.

Figure 2:
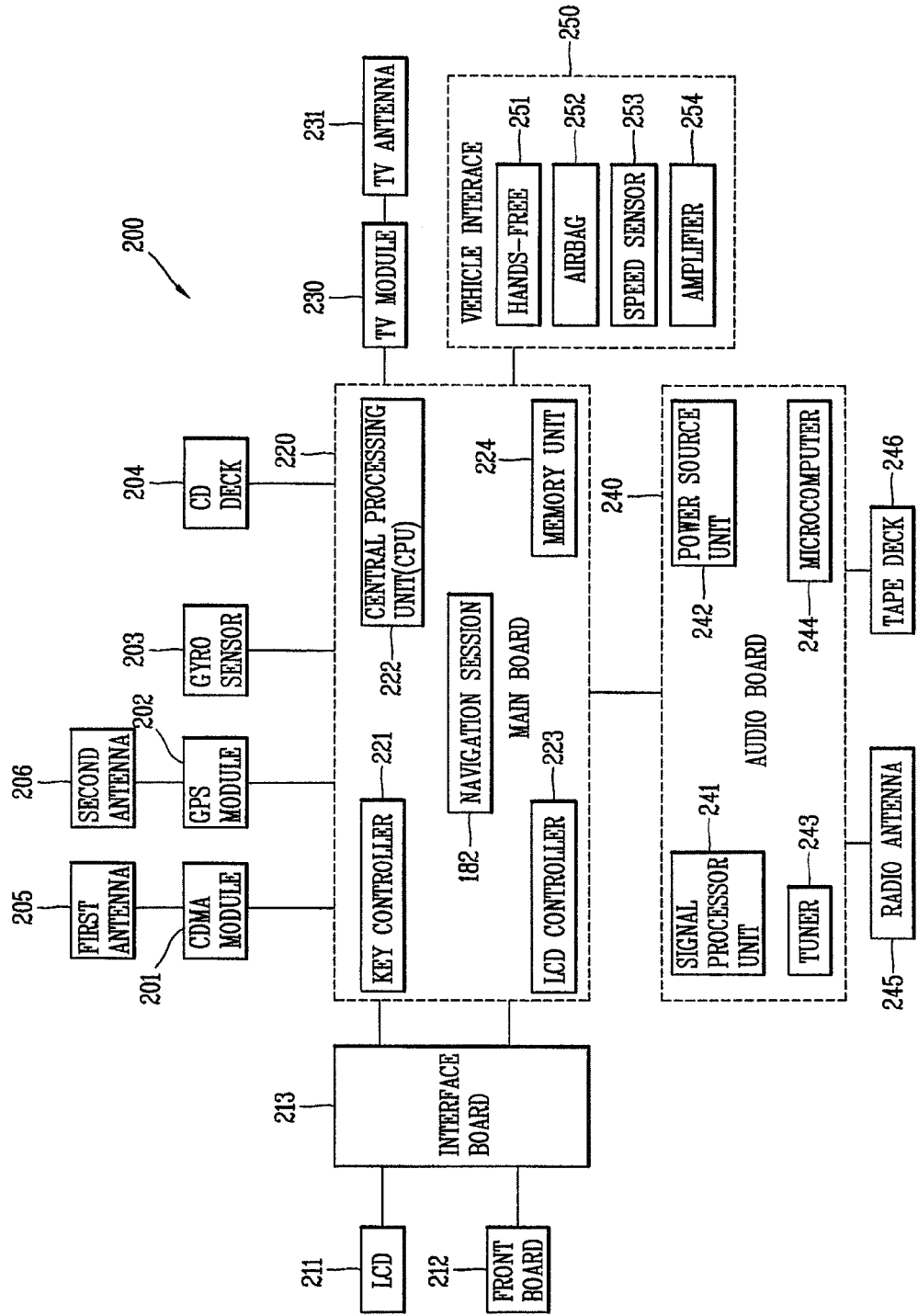
FIG. 2 is a block diagram showing a configuration of a telematics terminal for explaining a mobile terminal in accordance with one embodiment of the present invention.

FIG. 2 is a block diagram showing a configuration of a telematics terminal 200 for explaining a mobile terminal in accordance with one embodiment of the present invention. As shown, the telematics terminal 200 includes a Central Processing Unit (CPU) 222 for controlling the telematics terminal 200 overall, a key controller 221 for controlling various key signals, an LCD controller 223 for controlling an LCD, and a main board 220 having therein a memory 224 for storing various kinds of information.

The memory 224 stores map information (map data) for displaying road guidance information on a map of the display unit (or the LCD 211). Also, the memory 224 stores a traffic information collecting control algorithm for inputting traffic information according to the situation of a road along which the vehicle currently travels (runs), and information for controlling the algorithm.

The main board 220 includes a communication module 201 assigned with a unique device number and performing a voice communication and data transmission/reception through a mobile terminal mounted in a vehicle, a GPS module 202 configured to guide a location of the vehicle, receive a GPS signal for tracking a travel route from a start point to a destination, generate data on a current position of the vehicle based on the received GPS signal, or transmit traffic information collected by a user as a GPS signal, a gyro sensor 203 configured to sense a running direction of the vehicle, a CD deck 204 configured to reproduce a signal recorded in a CD (Compact Disk), etc.

The communication module 201 and the GPS module 202 transmit and receive signals via a first antenna 205 and a second antenna 206, respectively.

The main board 220 is connected to a TV module 230 for receiving a broadcast signal via a broadcast signal antenna (or TV antenna) 231. The main board 220 is connected to a liquid crystal display (LCD) 211 controlled by the LCD controller 223 via an interface board 213.

The LCD 211 processes a broadcasting signal received through the TV module 230 and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signal or text signal based on control signals of the LCD controller 223. As discussed above, the LCD 211 may also be configured to receive an input from a user via a touch screen.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected with the main board 220 and processes various audio signals. The audio board 240 includes a microcomputer 244 for controlling the audio board 240, a tuner 243 for receiving a radio signal through an antenna (or radio antenna) 245, a power source unit 242 for supplying power to the microcomputer 244 and a signal processing unit 241 for processing various voice signals for output.

The audio board 240 also includes a radio antenna 245 for receiving a radio signal and a tape deck 246 for reproducing an audio tape. The audio board 240 may further include an amplifier 254 for outputting a voice signal processed by the audio board 240.

The amplifier 254 is connected to a vehicle interface 250. Namely, the audio board 240 and the main board 220 are connected to the vehicle interface 250, respectively. A hands free 251 for inputting a voice signal without using a driver's hand, an airbag 252 configured for the security of a passenger, a speed sensor 253 for detecting the speed of the vehicle, or the like, may be connected to the vehicle interface 250.

The speed sensor 253 calculates a vehicle speed and provides the calculated vehicle speed information to the CPU 222.

The navigation session 300 applied to the mobile terminal 200 provides a general navigation function.

The central processing unit 222 applied to the telematics terminal 200 according to an embodiment of the present invention may change the operating state of a plurality of devices included in the controller of a mobile terminal when a preset event is generated. Furthermore, the central processing unit 222 applied to the telematics terminal 200 according to an embodiment of the present invention automatically recognizes a touch input as a touch by a user's grip and reconfigures a display region of the display unit based on the touch input if a partial region of the display unit is touched by the user's grip on the display unit having a touch screen, thereby preventing an error of the mobile terminal due to a wrong touch such as the user's grip, and the like.

Hereinafter, description will be given of a configuration of a mobile terminal in accordance with an exemplary embodiment with reference to FIG. 3. Here, the mobile terminal shown in FIG. 3 is applicable to various terminals such as a smart phone, a portable terminal, a mobile terminal, a Personal Digital Assistants (PDA), a notebook computer, a Wibro terminal, an Internet Protocol Television (IPTV) terminal, a telematics terminal, a navigation terminal, an Audio Video Navigation (AVN) terminal, a television, A/V (Audio/Video) system, a home theater system, and the like.

Figure 3:
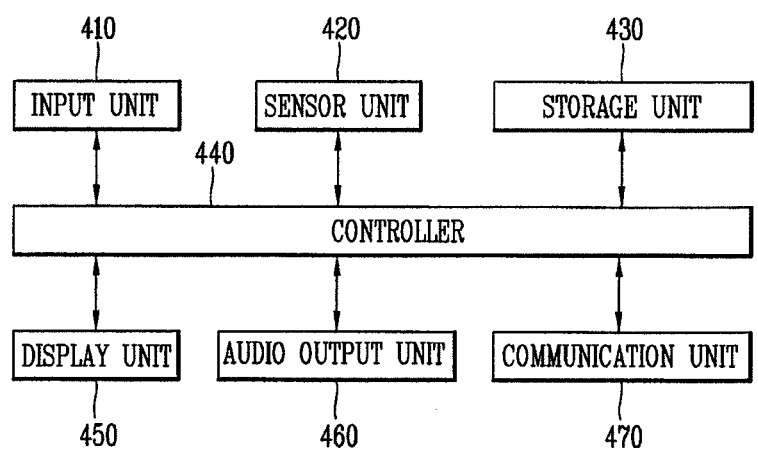
FIG. 3 is a block diagram showing a configuration of a mobile terminal in accordance with one embodiment of the present invention.

FIG. 3 is a block diagram showing a configuration of a mobile terminal in accordance with one embodiment of the present invention. As shown, the mobile terminal 400 comprises an input unit 410, a sensor unit 420, a storage unit 430, a controller 440, a display unit 450, an audio output unit 460, and a communication unit 470. All the elements of the mobile terminal 400, as shown in FIG. 3, are not necessarily required, and thus the mobile terminal 400 may be implemented with greater or less elements than the elements as shown in FIG. 3. FIG. 3 shows the mobile terminal 400 having various components, but it is understood that implementing all of the shown components is not a requirement. The mobile terminal 400 may alternatively implemented by greater or fewer components.

The input unit 410 receives a signal according to button manipulation or any function selection by the user, or receives a command or control signal generated by manipulation such as touching/scrolling a displayed screen. The input unit 410 receives a signal corresponding to information inputted by the user, and various devices such as a keypad, a jog shuttle, a mouse, a stylus pen, a touch pen, and the like may be used. Furthermore, the input unit 410 may include a microphone (not shown) and/or a camera (not shown), thereby receiving voice information and/or image information (or video information) through the microphone and/or camera.

The sensor unit 420 is provided on a predetermined location of the mobile terminal 400, particularly, a bezel region of the mobile terminal 400, thereby detecting a touch (including a proximity touch) input on the bezel region or a change of illumination value on the bezel region. At this time, the sensor unit 420 may include a plurality of sensor modules, and the plurality of sensor modules may include a touch sensor, a proximity sensor, an illumination sensor, and the like. In addition, the sensor unit 420 may detect a touch time (or touch duration time) according to the touch input.

Furthermore, when all the constituent elements of the mobile terminal includes a boardless feature, the sensor unit 420 may include one or more sensor modules provided in any location (front surface, lateral surface, rear surface, and the like) of the mobile terminal 400. At this time, the boardless region of the mobile terminal 400 may include the remaining touch region excluding preset touch regions, respectively, according to an application program or the like, in a bezel region provided in the mobile terminal 400 or a display region on the display unit 450. Here, the remaining touch region excluding preset touch regions, respectively, according to an application program or the like denotes a region in which any operation or function corresponding to a touch input is not carried out.

Furthermore, the sensor unit 420 is provided at a predetermined location of the mobile terminal 400, and may include a motion recognition sensor for detecting the motion of the mobile terminal 400. Here, the motion recognition sensor may include a sensor such as a geomagnetism sensor, an acceleration sensor, a gyro sensor, an inertial sensor, an altimeter, a vibration sensor, and the like, and additionally, sensors related to motion recognition may be included therein. The sensor unit 420 may detect a motion of the mobile terminal 400, for example, information including an inclined direction of the mobile terminal 400, an inclined angle and/or inclining speed thereof, a vibration direction and/or vibration frequency in the direction of top-down/left-right/diagonal, and the like. Here, the detected information (an inclined direction, an inclined angle and/or an inclining speed thereof, a vibration direction and/or a vibration frequency) is digitalized through a digital signal processing process, and the digitalized information is entered to the controller 440.

The storage unit 430 stores various user interfaces (UIs) and/or graphic user interfaces (GUIs). Furthermore, the storage unit 430 stores data and programs required for operating the mobile terminal 400. Furthermore, the storage unit 430 stores information (location information of the relevant sensor module among a plurality of sensor modules according to a touch/proximity touch, etc., an illumination value detected by an illumination sensor (or location information of a sensor module in which a change of the illumination value is detected), an inclined direction, an inclined angle and/or an inclining speed thereof, a vibration direction and/or a vibration frequency) detected by the sensor unit 420. The storage unit 430 stores data (including various information, control signals, etc.) transmitted from an information providing center or any mobile terminal connected by wired/wireless communication.

The controller 440 implements overall control functions of the mobile terminal 400. The controller 440 calculates (produces) a coordinate value corresponding to location information included in a signal received by the display unit 450. At this time, the received signal is a signal generated by a touch input (user input or user touch input) to any location on the display unit 450. Furthermore, the controller 440 determines whether the calculated coordinate value is located within a preset region (including one or more coordinate values), and configures an entire display region of the display unit 450 as an effective region (or effective display region) and a non-effective region (or non-effective display region) based on the calculated coordinate value when the calculated coordinate value is located within the preset region. Furthermore, if a second signal according to an additional touch input on the configured effective region is received, then the controller 440 performs an operation or function corresponding to the received second signal. Furthermore, if a third signal according to an additional touch input on the configured non-effective region is received, then the controller 440 does not perform an operation or function corresponding to the received third signal. In other words, the effective region may denote a region in which a touch input according to the user's touch input can be detected, and the non-effective region may denote a region in which a touch input according to the user's touch input is not detected.

Furthermore, the controller 440 determines whether the calculated coordinate value is located within a preset region (including one or more coordinate values), and checks whether a touch time for the any location detected by the sensor unit 420 exceeds a preset time if the calculated coordinate value is located within the preset region. Furthermore, as a result of the check, when the detected touch time exceeds the preset time, the controller 440 may configure an entire display region of the display unit 450 as an effective region and a non-effective region based on the calculated coordinate value.

Furthermore, the controller 440 calculates a coordinate value corresponding to location information included in a signal received by the display unit 450. At this time, the received signal is a signal generated by a touch input (user input or user touch input) to any location on the display unit 450.

The controller 440 determines whether the calculated coordinate value is located within a preset region (including one or more coordinate values), and reconfigures an entire display region of the display unit 450 based on the calculated coordinate when the calculated coordinate value is located within the preset region. In other words, the controller 440 reconfigures an entire display region of the display unit 450 on which any content (including any application, any data, screen, video, emoticon, etc.) is displayed, thereby not allowing any region including the calculated coordinate value to be included. Furthermore, the controller 440 controls such that the content is displayed on the reconfigured display region. Furthermore, if a fourth signal according to additional touch input to any region including the calculated coordinate value is received, then the controller 440 does not perform an operation or function corresponding to the received fourth signal. In other words, the controller 440 does not perform any operation or function according to the relevant touch input even though an additional touch input is generated on any region including the calculated coordinate value.

Furthermore, the controller 440 determines whether the calculated coordinate value is located within a preset region (including one or more coordinate values), and checks whether a touch time for any location detected by the sensor unit 420 exceeds a preset time. Furthermore, as a result of the check, when the detected touch time exceeds the preset time, the controller 440 reconfigures an entire display region of the display unit 450 based on the calculated coordinate.

Furthermore, the controller 440 calculates a fifth coordinate value corresponding to location information included in a fifth signal detected by the sensor unit 420. At this time, the received fifth signal is a signal in which a signal generated by a fifth touch input (or a change of the illumination value) is detected by the sensor unit 420. Furthermore, the controller 440 calculates a sixth coordinate value corresponding to location information included in a sixth signal received by the display unit 450. At this time, the received sixth signal is a signal generated by a sixth touch input to any location on the display unit 450. Here, the same reference coordinate values are used for the coordinate value by the sensor unit 420 and the coordinate value by the display unit 450.

Furthermore, when a distance between the calculated fifth coordinate value and sixth coordinate value is less than a threshold value, the controller 440 recognizes the received sixth signal as a user's grip or a touch by an error, thereby not performing any function or operation corresponding to the sixth signal. Furthermore, when a distance between the calculated fifth coordinate value and sixth coordinate value is less than a threshold value, the controller 440 configures an entire display region of the display unit 450 as an effective region (or effective display region) and a non-effective region (or non-effective display region) based on the calculated fifth coordinate value and/or sixth coordinate value. Furthermore, if a seventh signal according to an additional touch input is received on the configured effective region, then the controller 440 performs an operation or function corresponding to the received seventh signal. However, if a eighth signal according to an additional touch input is received on the configured non-effective region, then the controller 440 does not perform an operation or function corresponding to the received eighth signal.

Furthermore, when a distance between the calculated fifth coordinate value and sixth coordinate value is less than a threshold value, the controller 440 reconfigures an entire display region of the display unit 450 based on the calculated fifth coordinate value and/or sixth coordinate value. Furthermore, if the motion of the mobile terminal 400 is detected through a motion recognition sensor included in the sensor unit 420, then the controller 440 reconfigures the currently configured non-effective region and effective region based on the detected motion of the mobile terminal 400. In other words, the controller 440 configures a new non-effective region by adding a weight to the preset non-effective region based on the detected motion of the mobile terminal 400, and newly configures a preset effective region according to the reconfigured new non-effective region.

Furthermore, for a plurality of sequentially received signals (including a plurality of signals generated and received based on a plurality of touch inputs detected the sensor unit 420), the controller 440 checks whether location information each corresponding to the plurality of received signals is included in a preset location information, and as a result of the check, if location information each corresponding to the plurality of received signals is included in the preset location information, then the controller 440 performs a predefined operation or function corresponding to the plurality of received signals. Furthermore, if location information each corresponding to the plurality of received signals is not included in the preset location information, then the controller 440 recognizes the plurality of received signals as a touch by the user's grip, and does not perform a predefined operation or function corresponding to the plurality of received signals.

The display unit 450 may display various contents such as various menu screens using a user interface and/or a graphic user interface included in the storage unit 430 by a control of the controller 440. Here, the contents displayed on the display unit 450 may include various text or image data (including map data or various information data) and icons, a list menu, a menu screen including data such as a combo box, or the like. Furthermore, the display unit 450 may be a touch screen.

Furthermore, the display unit 450 receives a signal generated by any touch input (user input or user touch input). At this time, the touch input by the user may include an inner pointing being brought into contact with/coming close to the screen from out of the screen, an outer pointing being apart from/going away from a state of being contacted with the screen to out of the screen, a sliding indicating a movement between a touch screen and a contact of human body between the inner pointing and the outer pointing (the concept of "drag" in a mouse), and the like. Here, pointing may denote an act of indicating for a specific action.

Furthermore, the display unit 450 may be connected to a bezel region adjacent/attached to an outside (edge portion) of the display unit 450. A wrong touch input on the display unit 450 by the user's simple grip may be suppressed as the bezel region is wide, and a wrong touch input on the display unit 450 by the user's grip may be increased as the bezel region is narrow. In particular, in case where a front surface of the mobile terminal 400 is configured with a full screen of the display unit 450 without the bezel region, a wrong touch input on the display unit 450 by the user's grip may be generated.

Furthermore, the display unit 450 may display an indication for the effective region and non-effective region configured by a control of the controller 440. At this time, the indication for the non-effective region may be displayed with any one of a preset color, a preset pattern screen, a transparent state, and a 3-dimensional format. Furthermore, the display unit 450 displays a display region of the display unit 450 based on an entire display region reconfigured for the entire display region of the display unit 450 by a control of the controller 440. Furthermore, the display unit 450 adjusts the size of contents to display on the reconfigured entire display region by a control of the controller 440. At this time, the displayed contents may be moved by a predetermined distance in any direction while the previous size of contents is readjusted to be adapted to the size of the reconfigured entire display region, or the previous size of contents is maintained as is.

Furthermore, if signals corresponding to a series of sequential touch inputs are received on an entire display region of the display unit 450, then the display unit 450 outputs information (including location information) for the plurality of received signals to the controller 440.

The audio output unit 460 outputs audio information included in a predetermined signal-processed signal by the controller 440. Here, the audio output unit 460 may be a speaker. Furthermore, the audio output unit 460 may output a guide voice generated by the controller 440.

The communication unit 470 may include a wireless Internet module or a short-range communication module. Here, the wireless Internet technology may include WLAN (Wireless LAN), Wi-Fi, Wibro (Wireless Broadband), Wimax (World Interoperability for Microwave Access), HSDPA (High Speed Downlink Packet Access), IEEE 802.16, LTE (Long Term Evolution), WMBS (Wireless Mobile Broadband Service), and the like, and the short-range communication technology may include Bluetooth, Radio Frequency IDentification (RFID), Infrared Data Association (IrDA), Ultra WideBand (UWB), ZigBee, and the like.

Hereinafter, a control method of a mobile terminal according to the present invention will be described in detail with reference to FIGS. 1 to 15.

Figure 4:
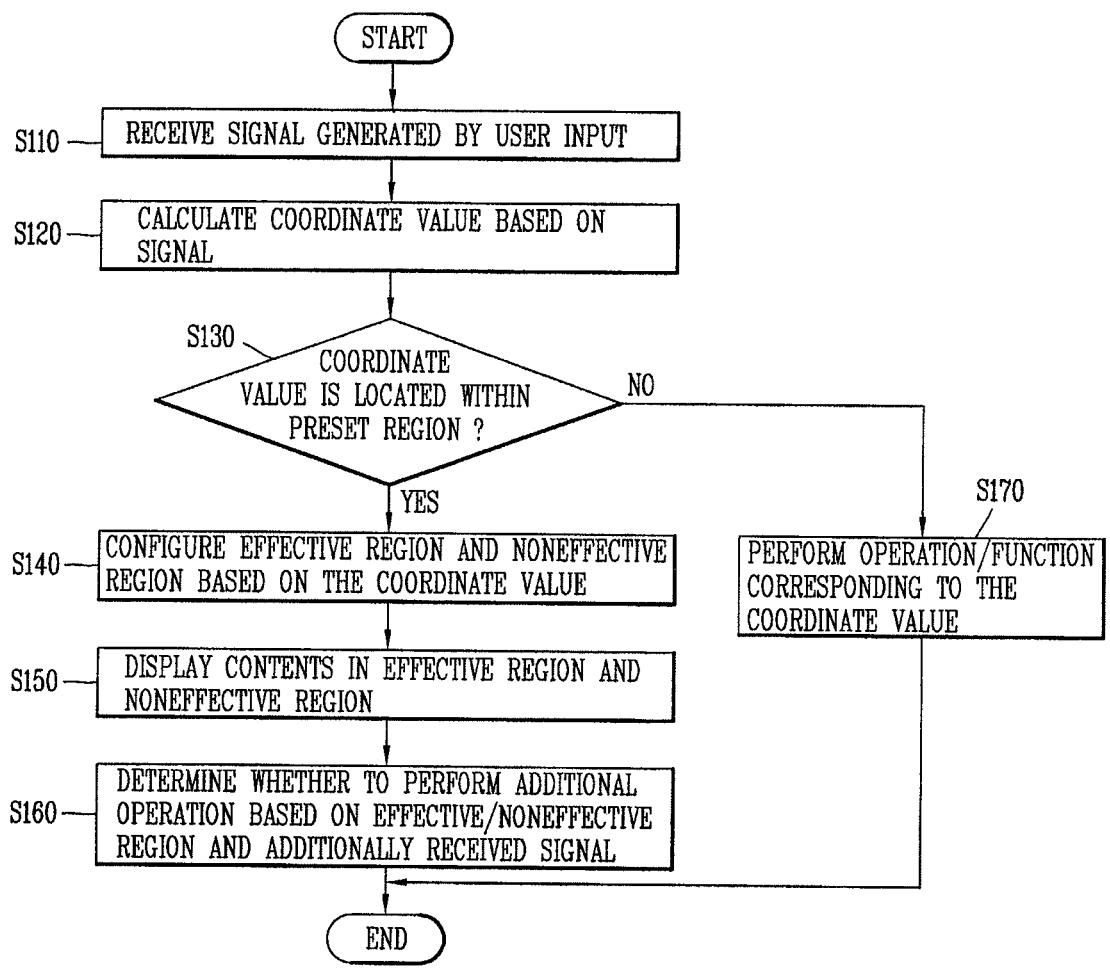
FIG. 4 is a flow chart showing a control method of a mobile terminal in accordance with a first embodiment of the present invention.

FIG. 4 is a flow chart showing a control method of a mobile terminal according to a first embodiment of the present invention.

Figure 5A:
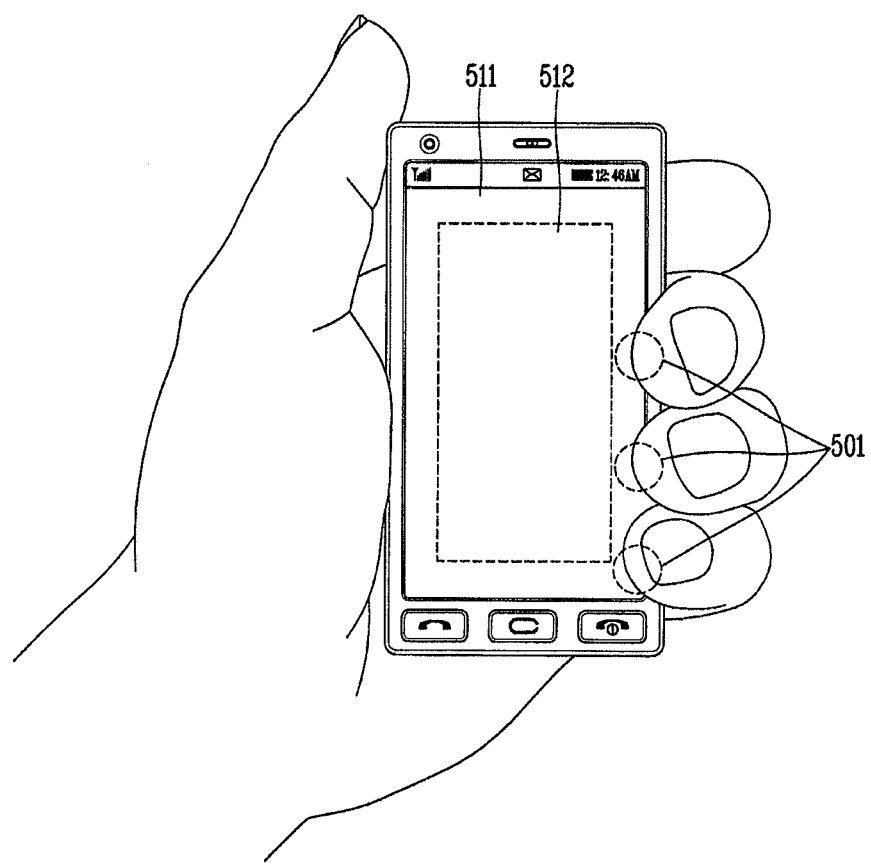
FIGS. 5A to 5E are views showing a screen of a display unit in accordance with one embodiment of the present invention.
Figure 5B:
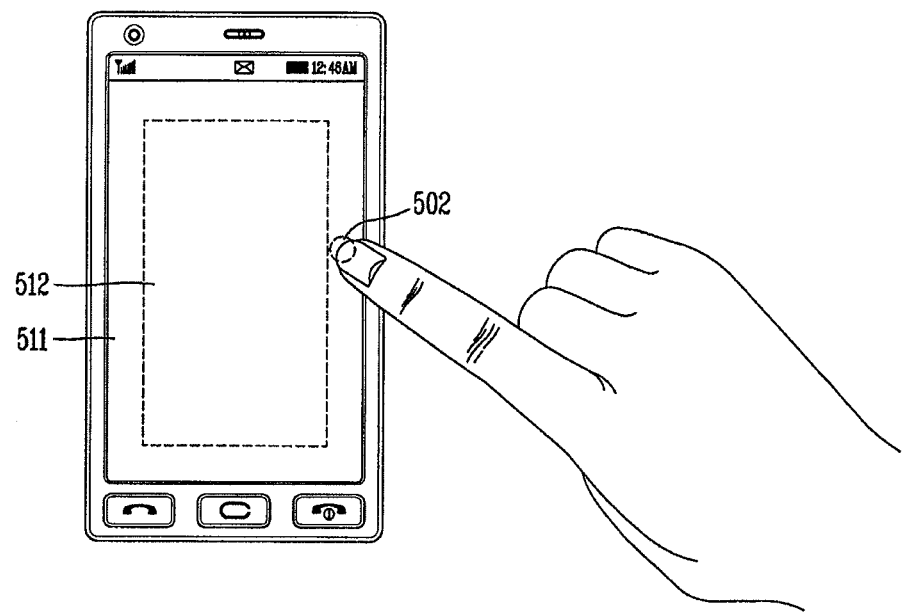
Figure 5C:
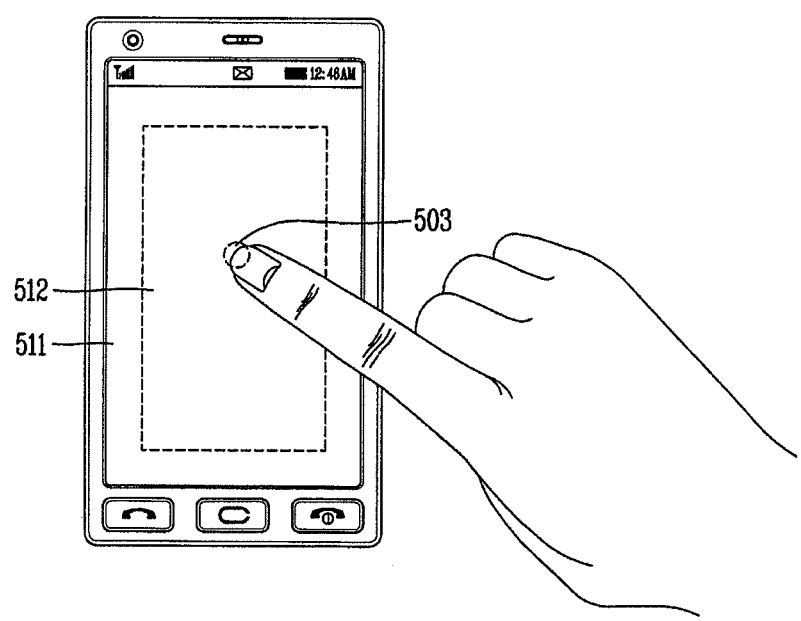

First, the display unit 450 receives (or detects) a first signal generated by a first touch input (first user input or first user touch input) to any location of the display unit 450. At this time, the display unit 450 may be a touch screen. As an example, the display unit 450 may receive a first control signal generated by a first user touch input to a first location 501 or second location 502 of the display unit 450 as shown in FIG. 5A or 5B. As another example, the display unit 450 may receive a first control signal generated by a first user touch input to a third location 503 of the display unit 450 as shown in FIG. 5C (S110).

Then, the controller 440 calculates a coordinate value corresponding to any location included in the received first signal. Also, the controller 440 detects a touch time (or duration time of the touch) to the any location (S120). Then, the controller 440 determines whether the calculated coordinate value is located within a preset region (including one or more coordinate values). As an example, the controller 440 determines whether a coordinate value calculated by corresponding to the first location 501 or second location 502 is located within the preset region 511 as shown in FIG. 5A or 5B. As another example, the controller 440 determines whether a coordinate value calculated by corresponding to the third location 503 is located within the preset region 511 as shown in FIG. 5C (S130).

As a result of the determination, if the calculated coordinate value is located within the preset region, then the controller 440 configures the calculated coordinate value by dividing an entire display region of the display unit 450 into an effective region and a non-effective region based on the calculated coordinate value. At this time, the effective region may denote a region in which a touch input according to the user's touch input can be detected, and the non-effective region may denote a region in which a touch input according to the user's touch input is not detected. Here, the non-effective region may be configured with a various types of regions such as a rectangle, a diamond, a circle, an ellipse, or the like within a predetermined distance.

Figure 5D:
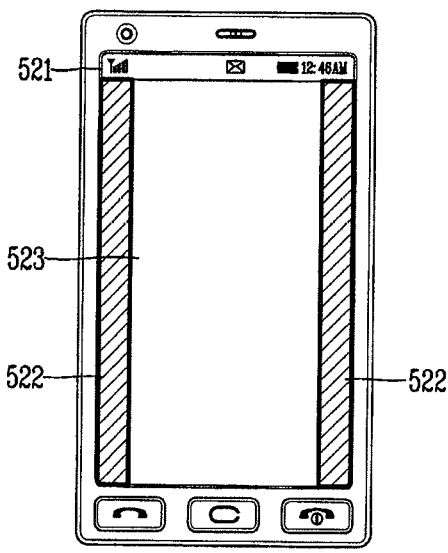

As an example, when the calculated coordinate value is located within the preset region, the controller 440 may configure a region including the calculated coordinate value as a non-effective region 522 in an entire display region 521 of the display unit 450, and may configure the remaining region excluding the non-effective region 522 in the entire display region 521 as an effective region 523 in the entire display region 521, as shown in FIG. 5D.

Figure 5E:
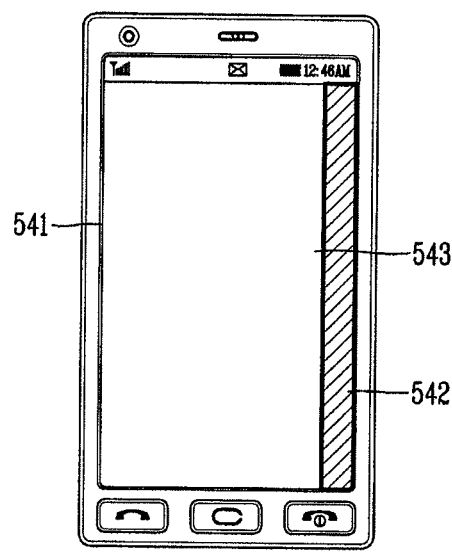

Furthermore, as a result of the determination, if the calculated coordinate value is located within the preset region, then the controller 440 may configure a partial region of one or more sides adjacent to the calculated coordinate value as a non-effective region in an entire display region (top/down/left/right sides) of the display unit 450, and configure the remaining region excluding the preset non-effective region as an effective region of the display unit 450. As an example, when the calculated coordinate value is located within the preset region, the controller 440 may configure one side (for example, right side) including the calculated coordinate value as a non-effective region 542 in an entire display region 541 (top/bottom/left/right sides) of the display unit 450, and configure the remaining region excluding the non-effective region 542 as an effective region 543, respectively, as shown in FIG. 5E.

Furthermore, when the calculated coordinate value is located within the preset region (for example, a preset non-effective region), the controller 440 does not perform any function corresponding to the received first signal. In other words, when the calculated coordinate value is located within the preset region, the controller 440 recognizes the received first signal as a touch by the user's grip even though there is any function corresponding to the coordinate value calculated based on the received first signal, and does not perform the any function corresponding to the first signal.

Furthermore, as a result of the determination, when the calculated coordinate value is located within the preset region, then the controller 440 may check whether a touch time for the detected any location exceeds a preset time. As a result of the check, when the detected touch time exceeds the preset time, controller 440 configures an entire display region of the display unit 450 as an effective region and a non-effective region based on the calculated coordinate value.

Furthermore, as a result of the check, when the detected touch time does not exceed the preset time, the controller 440 performs a preset operation or function corresponding to the calculated coordinate value based on the calculated coordinate value. As an example, when a coordinate value calculated by corresponding to the second location 502 as shown in FIG. 5B is located within the preset region 511 and the detected touch time does not exceed the preset time (for example, 3 seconds), the controller 440 may perform a preset function corresponding to the second location 502 (S140).

Then, the controller 440 displays contents on the display unit 450 based on the configured effective region and non-effective region. As an example, as shown in FIG. 5D, the controller 440 may display the content of previously displayed contents on an entire display region 521 of the display unit 450, and may display a region configured with a non-effective region 522 in the display region 521 with a preset color, or display transparently, or display in a 3-dimensional format, or display with a preset pattern screen (for example, slant, check pattern, etc.) (S150).

Then, if a second signal generated by a second user touch input to the non-effective region based on the configured effective region and non-effective region is received, then the controller 440 does not perform an additional operation (or function) corresponding to the received second signal.

Furthermore, if a third signal generated by a third user touch input to the effective region based on the configured effective region and non-effective region is received, then the controller 440 performs a preset operation (or function) corresponding to the received third signal (S160).

Furthermore, as a result of the determination (in the step S130), if the calculated coordinate value is not located within the preset region, then the controller 440 performs a preset operation or function corresponding to the calculated coordinate value. As an example, if the coordinate value calculated by corresponding to the third location 503 shown in FIG. 5C is not located within the preset region 511 but located within a preset second region 512, then the controller 440 may perform a preset function corresponding to the calculated coordinate value based on the detected third location 503 (S170).

In this manner, the mobile terminal 400 may automatically recognize the touch input as a touch by the user's grip or error if a partial region of the display unit is touched by the user's grip or error on the display unit having a touch screen.

Furthermore, in this manner, if any touch input is recognized as the user's grip or error, then the mobile terminal 400 may configure a specific region corresponding to the any touch input as a non-effective region, and configure the remaining region excluding the non-effective region in the display region as an effective region, respectively.

Figure 6:
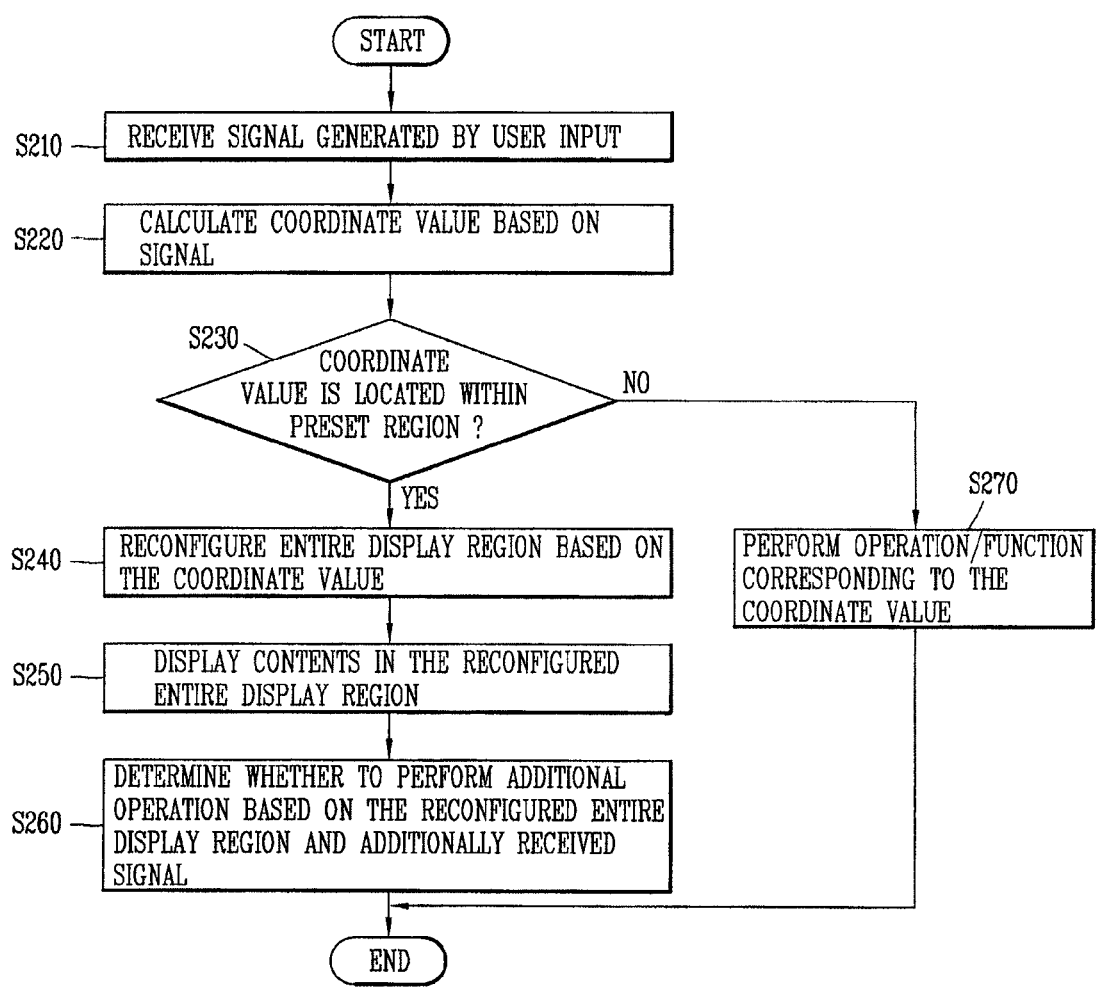
FIG. 6 is a flow chart showing a control method of a mobile terminal in accordance with a second embodiment of the present invention.

FIG. 6 is a flow chart showing a control method of a mobile terminal according to a second embodiment of the present invention.

First, the display unit 450 receives (or detects) a first signal generated by a first touch input (first user input or first user touch input) to any location of the display unit 450. At this time, the display unit 450 may be a touch screen. As an example, the display unit 450 may receive a first control signal generated by a first user touch input to a first location 501 or second location 502 of the display unit 450 as shown in FIG. 5A or 5B. As another example, the display unit 450 may receive a first control signal generated by a first user touch input to a third location 503 of the display unit 450 as shown in FIG. 5C (S210).

Then, the controller 440 calculates a coordinate value corresponding to any location included in the received first signal. Also, the controller 440 detects a touch time (or duration time of the touch) to the any location (S220). Then, the controller 440 determines whether the calculated coordinate value is located within a preset region (including one or more coordinate values). As an example, the controller 440 determines whether a coordinate value calculated by corresponding to the first location 501 or second location 502 is located within the preset region 511 as shown in FIG. 5A or 5B. As another example, the controller 440 determines whether a coordinate value calculated by corresponding to the third location 503 is located within the preset region 511 as shown in FIG. 5C (S230).

Figure 7A:
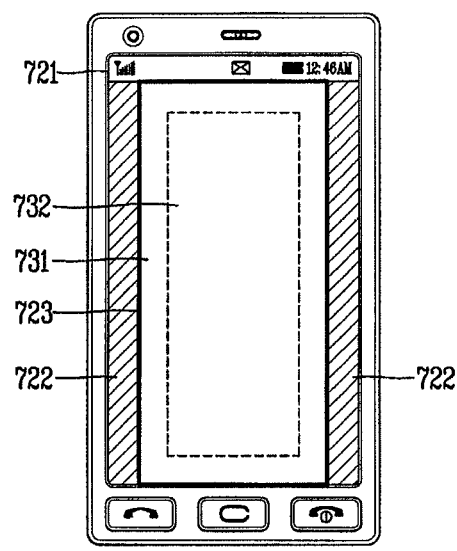
FIGS. 7A and 7B are views showing a screen of the display unit in accordance with one embodiment of the present invention.

As a result of the determination, if the calculated coordinate value is located within the preset region, then the controller 440 reconfigures an entire display region of the display unit 450 based on the calculated coordinate value. As an example, if the coordinate value calculated by corresponding to the first location 501 or second location 502 shown in FIG. 5A or 5B is located within the preset region, the controller 440 may reconfigure the remaining region excluding a region 722 including the calculated coordinate value in the entire display region 721 of the display unit 450 as a new display region 723 for a display region of the display unit 450 as shown in FIG. 7A. In addition, when reconfiguring the entire display region 721, the controller 440 may also reconfigure the preset region 511 together to configure new preset third region 731 and fourth region 732. Here, the region 722 including the calculated coordinate value may be configured with a various types of regions such as a rectangle, a diamond, a circle, an ellipse, or the like within a predetermined distance based on the coordinate value.

Furthermore, as a result of the determination, if the calculated coordinate value is located within the preset region, then the controller 440 may reconfigure the remaining region excluding a partial region of one or more sides adjacent to the calculated coordinate value in an entire display region (top/down/left/right sides) of the display unit 450 as a display region of the display unit 450.

Figure 7B:
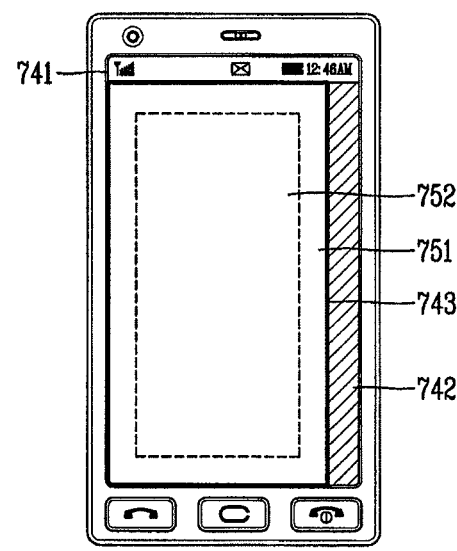

As an example, when the calculated coordinate value is located within the preset region, the controller 440 may reconfigure the remaining region 743 excluding a partial region 742 of a side (for example, right side) adjacent to the calculated coordinate value in an entire display region 741 (top/down/left/right sides) of the display unit 450 as a display region of the display unit 450 as shown in FIG. 7B. Furthermore, when reconfiguring the entire display region 741, the controller 440 may also reconfigure the preset region 511 together to configure new preset third location 751 and fourth location 752. Here, the partial region 742 of a side adjacent to the calculated coordinate value may be configured with a various types of regions such as a rectangle, a diamond, a circle, an ellipse, or the like within a predetermined distance based on the coordinate value.

Furthermore, when the calculated coordinate value is located within the preset region, the controller 440 does not perform any function corresponding to the received first signal. In other words, when the calculated coordinate value is located within the preset region, the controller 440 recognizes the received first signal as a touch by the user's grip even though there is any function corresponding to the coordinate value calculated based on the received first signal, and does not perform the any function corresponding to the first signal.

Furthermore, as a result of the determination, when the calculated coordinate value is located within the preset region, then the controller 440 may check whether a touch time for the detected any location exceeds a preset time. As a result of the check, when the detected touch time exceeds the preset time, controller 440 reconfigures an entire display region of the display unit 450 based on the calculated coordinate value.

Furthermore, as a result of the check, when the detected touch time does not exceed the preset time, the controller 440 performs a preset operation or function corresponding to the calculated coordinate value based on the calculated coordinate value. As an example, when a coordinate value calculated by corresponding to the second location 502 as shown in FIG. 5B is located within the preset region 511 and the detected touch time does not exceed the preset time (for example, 3 seconds), the controller 440 may perform a preset function corresponding to the second location 502 (S240).

Then, the controller 440 adjusts the size of contents displayed on the display unit 450 to be adapted to the reconfigured display region to display based on the reconfigured display region.

As an example, as shown in FIG. 7A, the controller 440 may adjust the size of contents to be adapted to the reconfigured display region 723 to display on a display region of the display unit 450. At this time, the controller 440 may display a region 722 including the calculated coordinate value with a preset color, or display transparently, or display in a 3-dimensional format, or display with a preset pattern screen (for example, slant, check pattern, etc.). In other words, as shown in FIG. 7A, the controller 440 may display the content of previously displayed contents by readjusting the size of contents to be adapted to the size of the reconfigured display region 723.

Furthermore, the controller 440 may move (or shift) the content of previous contents displayed on the display unit 450 in the top/bottom/left/right direction by a top/bottom/left/right size of the partial region 742 of the side adjacent to the calculated coordinate value to display based on the reconfigured display region. As an example, the controller 440 may move (or shift) the content of the previously displayed contents in the top/bottom/left/right direction by a top/bottom/left/right size of the partial region 742 of the side adjacent to the calculated coordinate value (for example, move in the right direction by a size of the right side of the partial region 742) to display on the reconfigured display region 743 shown in FIG. 7B. In this manner, if the content of the previously displayed contents is moved to be displayed on the reconfigured display region 743, then some content of the previously displayed contents may not be displayed on the reconfigured display region 743 (S250).

Then, if a second signal generated by a second user touch input to a region excluding the reconfigured display region, i.e., a region including the calculated coordinate value, based on the configured display region is received, then the controller 440 does not perform an additional operation (or function) corresponding to the received second signal.

Furthermore, if a third signal generated by a third user touch input to the reconfigured display region based on the reconfigured display region is received, then the controller 440 performs a preset operation (or function) corresponding to the received third signal (S260).

Furthermore, as a result of the determination (in the step S230), if the calculated coordinate value is not located within the preset region, then the controller 440 performs a preset operation or function corresponding to the calculated coordinate value. As an example, if the coordinate value calculated by corresponding to the third location 503 shown in FIG. 5C is not located within the preset region 511 but located within a preset second region 512, then the controller 440 may perform a preset function corresponding to the calculated coordinate value based on the detected third location 503 (S270). In this manner, the mobile terminal 400 may automatically recognize the touch input as a touch by the user's grip or error if a partial region of the display unit is touched by the user's grip or error on the display unit having a touch screen.

Furthermore, in this manner, if any touch input is recognized as a touch by the user's grip, then the mobile terminal 400 may reconfigure an entire display region of the display unit on which contents are displayed.

Figure 8:
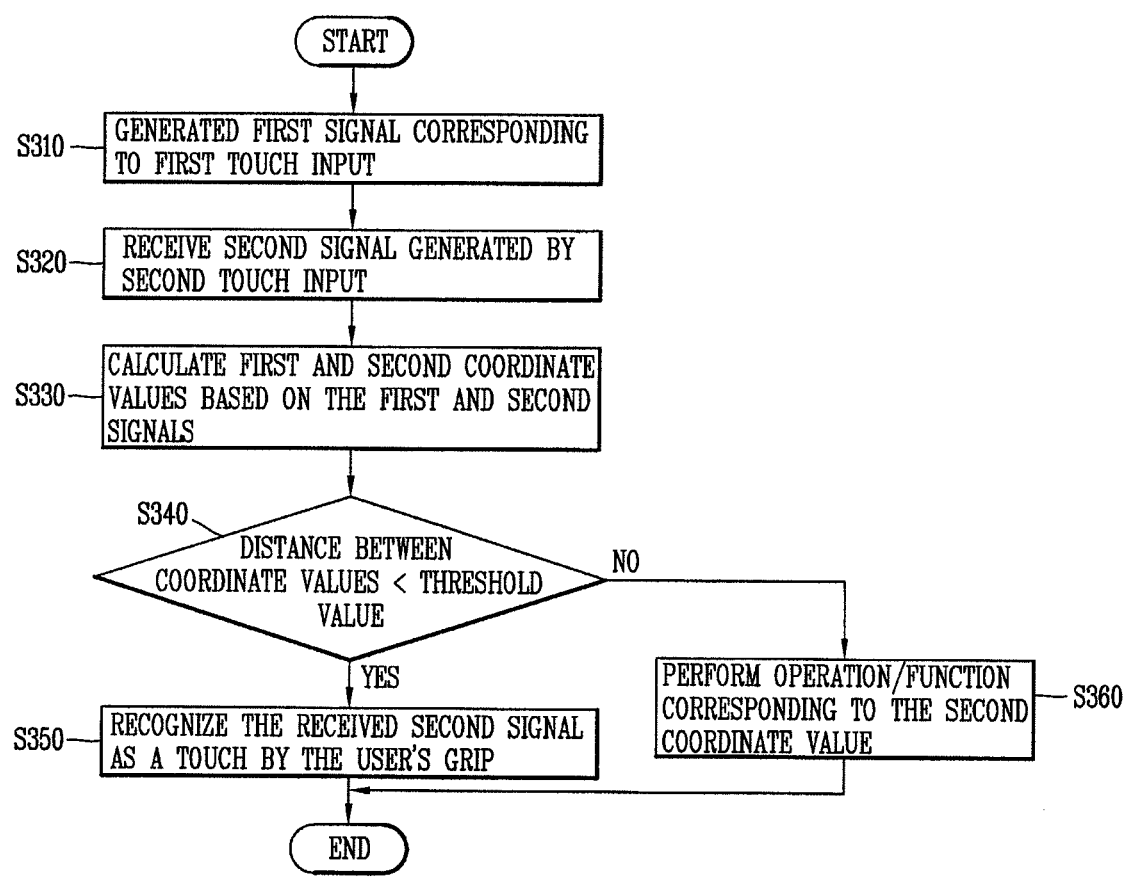
FIG. 8 is a flow chart showing a control method of a mobile terminal in accordance with a third embodiment of the present invention.

FIG. 8 is a flow chart showing a control method of a mobile terminal according to a third embodiment of the present invention.

First, the sensor unit 420 detects a first touch input (or a change of illumination value according to a first touch/proximity input) to at least one of a plurality of sensor modules included in the sensor unit 420, and generates a first signal corresponding to the detected first touch input (or a change of illumination value according to a first touch/proximity input) to output to the controller 440. Here, the sensor unit 420 may be configured by arranging a plurality of sensor modules in a bezel region adjacent to the display unit 450. At this time, the plurality of sensor modules may include a touch sensor, a proximity sensor, an illumination sensor, and the like. Also, the remaining touch regions (or remaining display regions) excluding a preset touch region previously configured according to the application program or the like, respectively, in a display region of the display unit 450, may be also included in the bezel region.

Figure 9A:
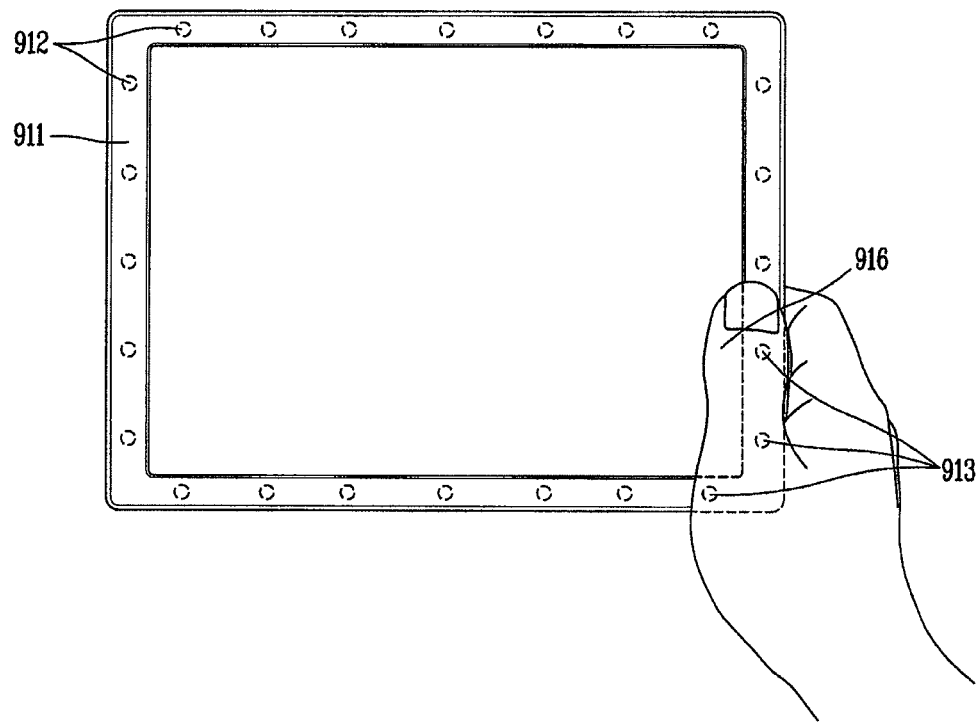
FIGS. 9A to 9B are views showing a screen of the display unit in accordance with one embodiment of the present invention.

As an example, as shown in FIG. 9A, the sensor unit 420 detects a first touch input 913 through at least one of a plurality of sensor modules 912 (including touch sensors) configured in the bezel region 911, and generates a first signal corresponding to the detected first touch input 913. At this time, the first touch input 913 may include one or more touch inputs by one or more sensor modules, respectively, among the plurality of sensor modules 912.

As another example, the sensor unit 420 detects a first touch input (or first proximity touch) 913 according to the proximity of any object through at least one of sensor module among a plurality of sensor modules 912 (including proximity sensors) configured in the bezel region 911, and generates a first signal corresponding to the detected first touch input 913.

As another example, the sensor unit 420 detects a change of illumination value according to the proximity or touch of any object through at least one of sensor module among a plurality of sensor modules 912 (including illumination sensors) configured in the bezel region 911, and generates a first signal corresponding to the location of the sensor module in which the change of the illumination value has been detected (S310).

Then, the display unit 450 receives a second signal generated by a second touch input to any location of the display unit 450. At this time, the display unit 450 may be a touch screen.

As an example, as shown in FIG. 9A, the display unit 450 may receive a second control signal generated by a second user touch input to a second location 916 of the display unit 450 (S320).

Then, the controller 440 calculates coordinate values corresponding to any locations included in the first signal outputted from the sensor unit 420 and the second signal received from the display unit 450, respectively. In other words, the controller 440 calculates a first coordinate value corresponding to any location included in the first signal outputted from the sensor unit 420, and calculates a second coordinate value corresponding to any other location included in the second signal received from the sensor unit 420. At this time, if information for a plurality of locations is included in the first signal or second signal, respectively, the controller 440 may calculate coordinate values corresponding to a plurality of locations, respectively (S330).

Then, the controller 440 determines whether a distance between the calculated first coordinate value and second coordinate value is less than a preset threshold value (S340). As a result of the determination, when a distance between the calculated first coordinate value and the second coordinate value is less than a preset threshold value, the controller 440 recognizes the received second signal as a touch by the user's grip, and does not perform any function corresponding to the second signal.

Furthermore, when a distance between the calculated first coordinate value and the second coordinate value is less than a preset threshold value, the controller 440 recognizes the received second signal as a touch by the user's grip, and configures a predetermined region of one or more sides most adjacent to the calculated first coordinate value and/or the second coordinate value in an entire display region (top/down/left/right sides) of the display unit 450 as a non-effective region, thereby configuring the configured non-effective region as a region in which a touch input by the user's touch input is not detected.

Figure 9B:
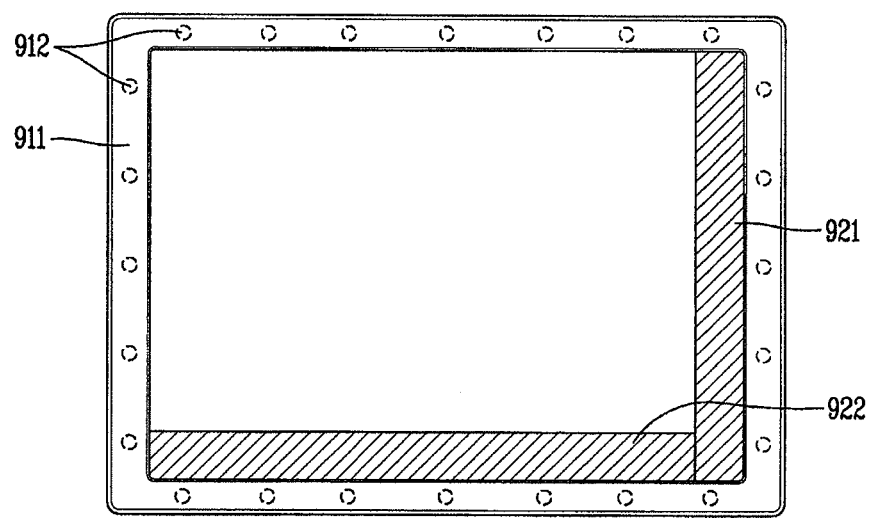

As an example, when a distance between the calculated first coordinate value and the second coordinate value is less than a preset threshold value, the calculated first coordinate value and/or the second coordinate value shown in FIG. 9A are adjacent to the right side (right-sided surface) and bottom side (bottom-sided surface) of the display unit 450, and thus the controller 440 configures a predetermined region of the right and bottom sides of the display unit 450 as a non-effective region 921, 922, and does not perform an additional operation or function corresponding to an additional signal according to the user's touch input for the configured non-effective region 921, 922 as shown in FIG. 9B (S350).

Furthermore, as a result of the determination, when a distance between the calculated first coordinate value and the second coordinate value is greater than or equal to the preset threshold value, the controller 440 performs a preset operation or function corresponding to a second coordinate value calculated based on the received second signal (S360).

Figure 10:
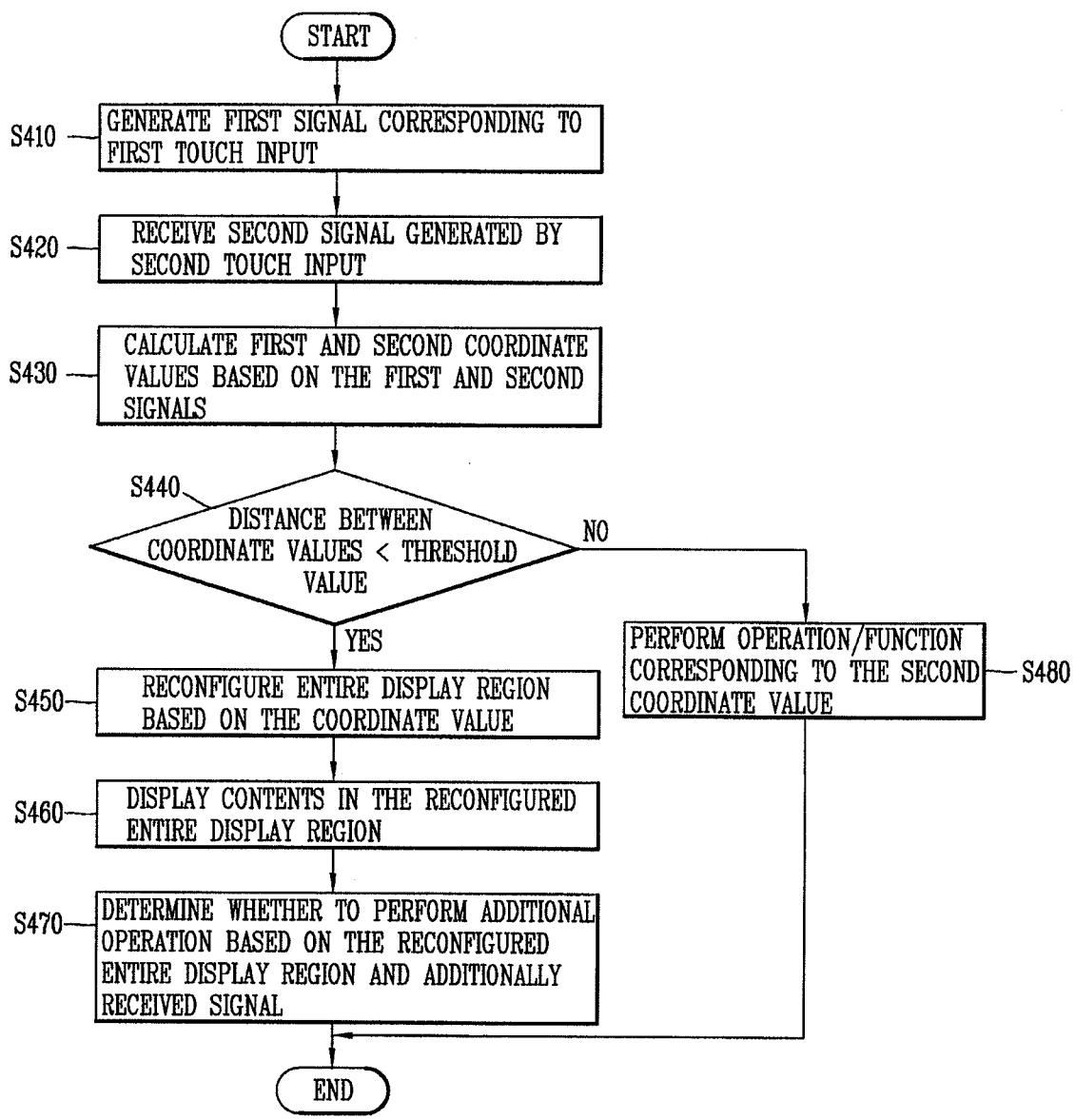
FIG. 10 is a flow chart showing a control method of a mobile terminal in accordance with a fourth embodiment of the present invention.

FIG. 10 is a flow chart showing a control method of a mobile terminal according to a fourth embodiment of the present invention.

First, the sensor unit 420 detects a first touch input (or a change of illumination value according to a first touch/proximity input) to at least one of a plurality of sensor modules included in the sensor unit 420, and generates a first signal corresponding to the detected first touch input (or a change of illumination value according to a first touch/proximity input)

to output to the controller 440. Here, the sensor unit 420 may be configured by arranging a plurality of sensor modules in a bezel region adjacent to the display unit 450. At this time, the plurality of sensor modules may include a touch sensor, a proximity sensor, an illumination sensor, and the like. Also, the remaining touch regions (or remaining display regions) excluding a preset touch region previously configured according to the application program or the like, respectively, in a display region of the display unit 450, may be also included in the bezel region.

As an example, as shown in FIG. 9A, the sensor unit 420 detects a first touch input 913 through at least one of a plurality of sensor modules 912 (including touch sensors) configured in the bezel region 911, and generates a first signal corresponding to the detected first touch input 913. At this time, the first touch input 913 may include one or more touch inputs by one or more sensor modules, respectively, among the plurality of sensor modules 912.

As another example, the sensor unit 420 detects a first touch input (or first proximity touch) 913 according to the proximity of any object through at least one of sensor module among a plurality of sensor modules 912 (including proximity sensors) configured in the bezel region 911, and generates a first signal corresponding to the detected first touch input 913.

As another example, the sensor unit 420 detects a change of illumination value according to the proximity or touch of any object through at least one of sensor module among a plurality of sensor modules 912 (including illumination sensors) configured in the bezel region 911, and generates a first signal corresponding to the location of the sensor module in which the change of the illumination value has been detected (S410).

Then, the display unit 450 receives a second signal generated by a second touch input to any location of the display unit 450. At this time, the display unit 450 may be a touch screen. As an example, as shown in FIG. 9A, the display unit 450 may receive a second control signal generated by a second user touch input to a second location 916 of the display unit 450 (S420).

Then, the controller 440 calculates coordinate values corresponding to any locations included in the first signal outputted from the sensor unit 420 and the second signal received from the display unit 450, respectively. In other words, the controller 440 calculates a first coordinate value corresponding to any location included in the first signal outputted from the sensor unit 420, and calculates a second coordinate value corresponding to any other location included in the second signal received from the sensor unit 420. At this time, if information for a plurality of locations is included in the first signal or second signal, respectively, the controller 440 may calculate coordinate values corresponding to a plurality of locations, respectively (S430).

Then, the controller 440 determines whether a distance between the calculated first coordinate value and second coordinate value is less than a preset threshold value (S440).

As a result of the determination, when a distance between the calculated first coordinate value and the second coordinate value is less than the preset threshold value, the controller 440 recognizes the received second signal as a touch by the user's grip, and reconfigures an entire display region of the display unit 450 based on the calculated first coordinate value and/or second coordinate value.

Figure 11:
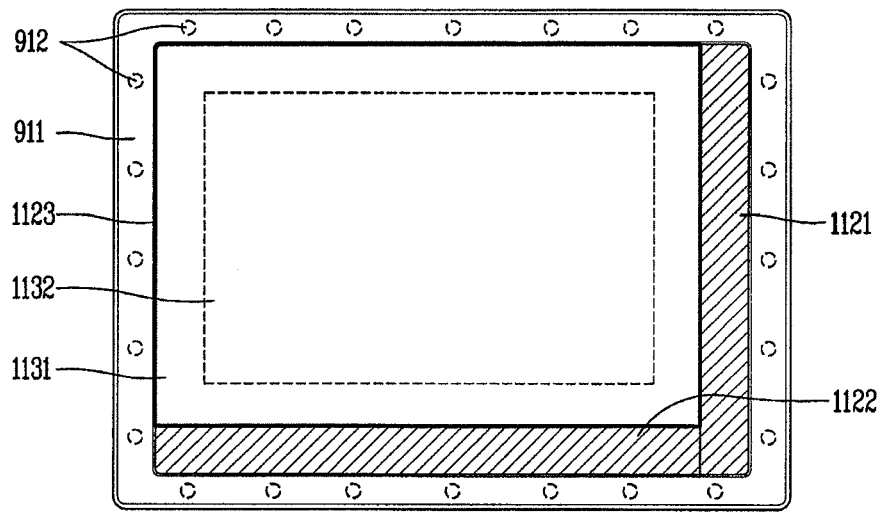
FIG. 11 is a view showing a screen of the display unit in accordance with one embodiment of the present invention.

As an example, when a distance between a first coordinate value corresponding to the first location 913 and a second coordinate value corresponding to the second location 916 shown in FIG. 9A is less than the preset threshold value, as shown in FIG. 11, the controller 440 may reconfigure the remaining region excluding a region 1121, 1122 including the calculated first coordinate value and the second coordinate value in an entire display region of the display unit 450 as a new display region 1123 based on the calculated first coordinate value and the second coordinate value. At this time, the display region 1123 may be configured not to include the calculated first coordinate value and the second coordinate value by a control of the controller 440. In addition, when reconfiguring the entire display region, the controller 440 may also reconfigure the preset region together to configure new preset third region 1131 and fourth region 1132. Here, the region 1121, 1122 including the calculated first coordinate value and the second coordinate value may be configured with a various types of regions such as a rectangle, a diamond, a circle, an ellipse, or the like within a predetermined distance based on the coordinate value.

Furthermore, as a result of the determination, when a distance between the calculated first coordinate value and the second coordinate value is less than the preset threshold value, the controller 440 may reconfigure the remaining region excluding a partial region of one or more sides adjacent to the calculated first coordinate value and the second coordinate value in an entire display region (top/down/left/right sides) of the display unit 450 as a display region of the display unit 450.

As an example, when a distance between a first coordinate value corresponding to the first location 913 and a second coordinate value corresponding to the second location 916 shown in FIG. 9A is less than the preset threshold value, as shown in FIG. 11, the controller 440 may reconfigure the remaining region 1123 excluding a partial region 1121, 1122 of a side (for example, a right side and a bottom side) adjacent to the calculated first coordinate value and the second coordinate value in an entire display region (top/down/left/right sides) of the display unit 450 as a display region of the display unit 450 based on the calculated first coordinate value and the second coordinate value.

Furthermore, as a result of the determination, when a distance between the calculated first coordinate value and the second coordinate value is less than the preset threshold value, then the controller 440 may check whether a touch time for the detected any location exceeds a preset time. As a result of the check, when the detected touch time exceeds the preset time, controller 440 reconfigures an entire display region of the display unit 450 based on the calculated first coordinate value and the second coordinate value.

Furthermore, as a result of the check, when the detected touch time does not exceed the preset time, the controller 440 performs a preset operation or function corresponding to the calculated first coordinate value and/or second coordinate value based on the calculated first coordinate value and/or second coordinate value (S450).

Then, the controller 440 adjusts the size of contents displayed on the display unit 450 to be adapted to the reconfigured display region to display based on the reconfigured display region. As an example, as shown in FIG. 11, the controller 440 may adjust the size of contents to be adapted to the reconfigured display region 1123 to display on a display region of the display unit 450. At this time, the controller 440 may display a region 1121, 1122 including the calculated first coordinate value and/or second coordinate value with a preset color, or display transparently, or display in a 3-dimensional format, or display with a preset pattern screen (for example, slant, check pattern, etc.). In other words, as shown in FIG. 11, the controller 440 may display the content of previously displayed contents by readjusting the size of contents to be adapted to the size of the reconfigured display region 1123.

Furthermore, the controller 440 may move the content of previous contents displayed on the display unit 450 in the top/bottom/left/right direction by a top/bottom/left/right size of the partial region of the side adjacent to the calculated coordinate value to display based on the reconfigured display region.

As an example, the controller 440 may move the content of the previously displayed contents in the top/bottom/left/right direction by a top/bottom/left/right size of the partial region 1121, 1122 of the side adjacent to the calculated coordinate value (for example, move in the right direction by a size of the right side of the partial region 1121, 1122) to display on the reconfigured display region 1123 shown in FIG. 11. In this manner, if the content of the previously displayed contents is moved to be displayed on the reconfigured display region 1123, then some content of the previously displayed contents may not be displayed on the reconfigured display region 1123 (S460).

Then, if a second signal generated by a second user touch input to a region excluding the reconfigured display region, i.e., a region including the calculated coordinate value, based on the configured display region is received, then the controller 440 does not perform an additional operation (or function) corresponding to the received second signal.

Furthermore, if a third signal generated by a third user touch input to the reconfigured display region based on the reconfigured display region is received, then the controller 440 performs a preset operation (or function) corresponding to the received third signal (S470).

Furthermore, as a result of the determination (in the step S440), when a distance between the calculated first coordinate value and the second coordinate value is greater than or equal to the preset threshold value, the controller 440 performs a preset operation or function corresponding to a second coordinate value calculated based on the received second signal (S480).

In this manner, if a bezel region of the 400 and a partial region of the display unit are touched and a distance between the two regions is in proximity, then the mobile terminal 400 automatically recognizes the touch input as a touch by the user's grip, and reconfigures the display screen.

Figure 12:
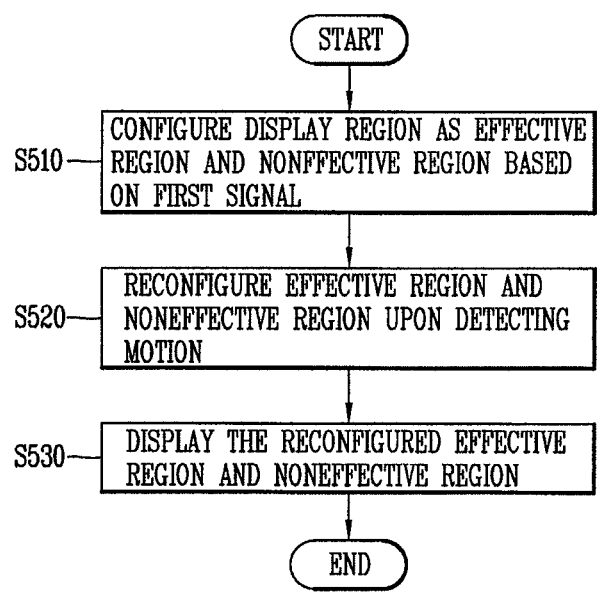
FIG. 12 is a flow chart showing a control method of a mobile terminal in accordance with a fifth embodiment of the present invention.

FIG. 12 is a flow chart showing a control method of a mobile terminal according to a fifth embodiment of the present invention.

First, the controller 440 configures an entire display region of the display unit 450 as a first effective region and a first non-effective region based on a first signal generated by a first touch input (first user input or first user touch input) on the display unit 450 and/or a bezel region adjacent to the display unit 450. Furthermore, the controller 440 displays the configured first effective region and first non-effective region on the display unit 450. At this time, the configured first non-effective region may be displayed with a preset color, or displayed transparently, or displayed in a 3-dimensional format, or displayed with a preset pattern screen (for example, slant, check pattern, etc.). Here, the effective region may denote a region in which a touch input according to the user's touch input can be detected, and the non-effective region may denote a region in which a touch input according to the user's touch input is not detected.

Figure 13A:
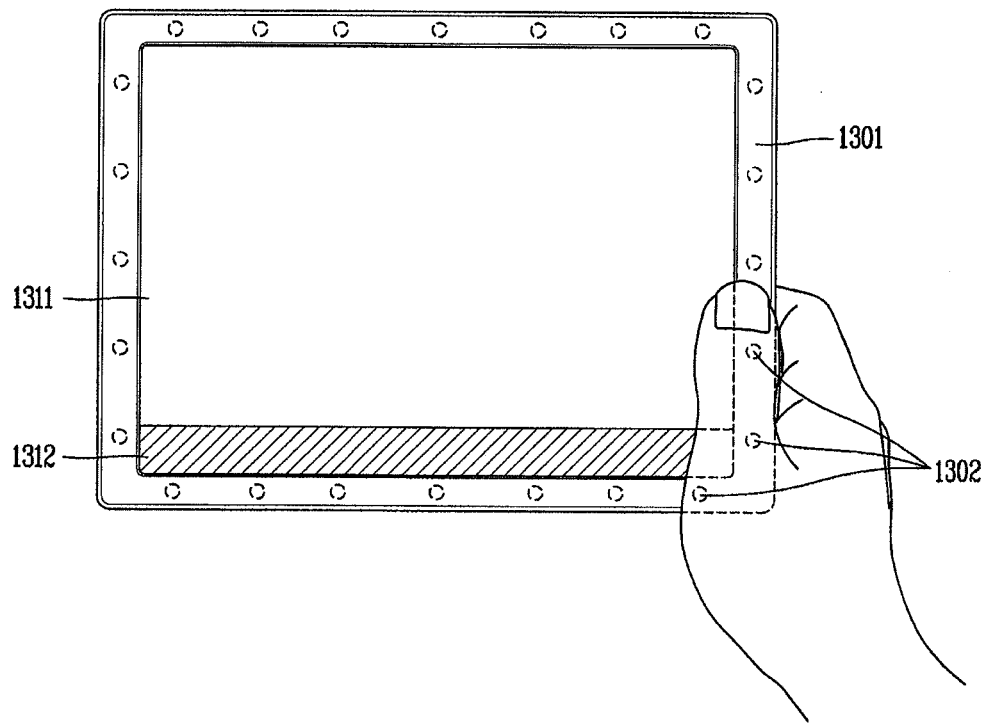
FIGS. 13A to 13B are views showing a screen of the display unit in accordance with one embodiment of the present invention.

For example, as shown in FIG. 13A, the controller 440 displays a first effective region 1311 and a first non-effective region 1312 configured based on a first signal generated by a first touch or a sequence of touches to one or more sensors 1302 on a body of the display unit 450 or on the bezel region 1301 of the display unit 450.

Furthermore, in FIG. 13A, only a partial side (for example, bottom side, however another side portion may be the partial side) of the display unit 450 is displayed as a non-effective region, but one or more sides of the top/down/left/right sides on the display unit 450 may be configured as a non-effective region in addition to the partial side. In other words, if one or more edges or a predetermined region of all the edges on the display unit 450 are configured as a non-effective region and the user rotates the terminal from a horizontal direction to a vertical direction or vise versa, then a temporary weight may be given to a side (for example, bottom end or another end portion) on which a wrong touch input for grip is temporarily expected for the non-effective region by considering the user's habit (for example, including the user's habit of gripping a bottom end portion capable of supporting the weight of a terminal) (S510).

Then, if the motion of the mobile terminal 400 is detected through an operation recognition sensor included in the sensor unit 420, then the controller 440 adds a weight to the first non-effective region between the configured first effective region and first non-effective region based on the detected motion of the mobile terminal 400, thereby reconfiguring the first effective region and first non-effective region. At this time, the controller 440 may add a preset weight to the first non-effective region based on the detected motion of the mobile terminal 400, thereby increasing the size (or range) of the first non-effective region, and relatively decreasing the size of the first effective region (S520).

Then, the controller 440 displays the reconfigured second non-effective region and second effective region on the display unit 450. For example, as shown in FIG. 13A, when the mobile terminal 400 detects a motion such as rotating clockwise or counterclockwise by an operation recognition sensor included in the sensor unit 420 at a state that the first effective region 1311 and the first non-effective region 1312 are displayed on the display unit 450, the controller 440 reconfigures the first effective region 1311 and the first non-effective region 1312 to configure the second effective region 1321 and the second non-effective region 1322, and displays the second effective region 1321 and the second non-effective region 1322 on the display unit 450 as shown in FIG. 13B (S530).

In the example of FIG. 13A, the first non-effective region 1312 may be a region close to one or more of the sensors 1302 touched by the user. That is, the placement of first non-effective region 1312 may vary based on where the user grips the device.

Figure 13B:
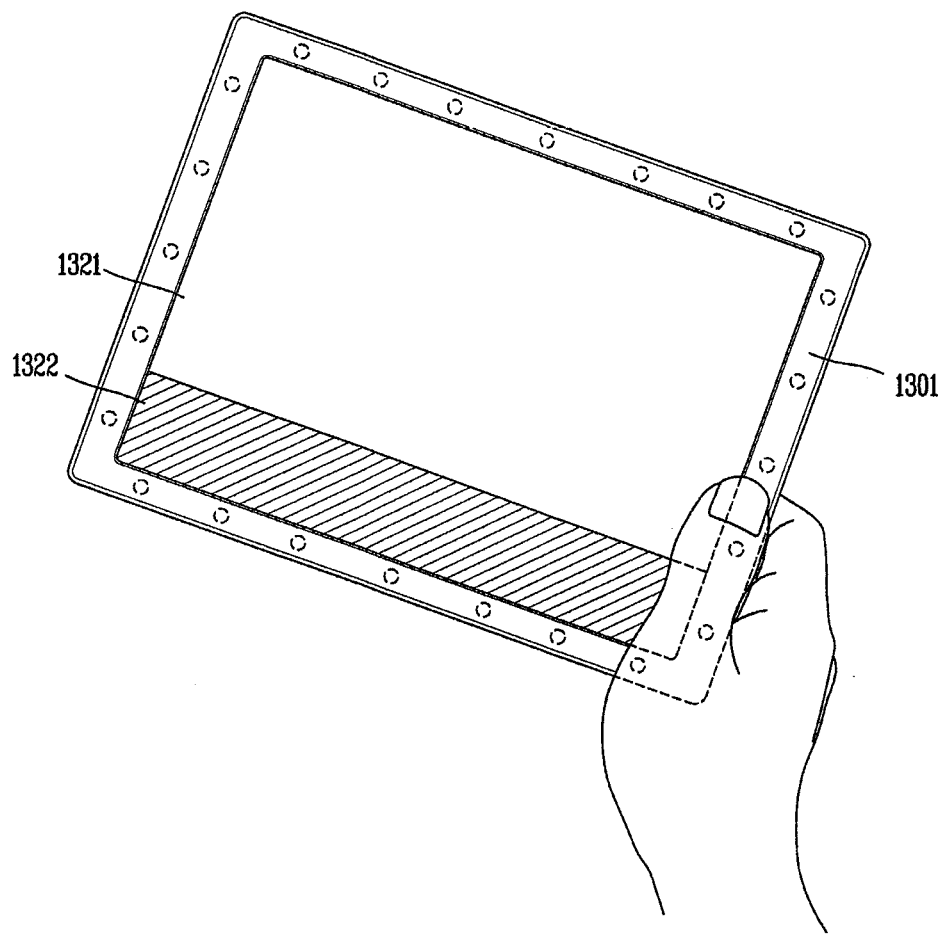

In the examples shown in FIGS. 13A-13B, the controller 440 displays a first effective region 1311 and a first non-effective region 1312 configured based on a first signal generated by a first touch or a sequence of touches to one or more sensors 1302 on a body of the display unit 450 or on the bezel region 1301 of the display unit 450. However, the controller 440 may also display a first effective region 1311 and a first non-effective region 1312 configured based on a first signal generated by touches to one or more the sensors 1302 as well as one or more touches to the display (e.g., touches to first effective region 1311 and/or first non-effective region 1312.) These multiple touches may be simultaneous or may be in a sequence. Thus, if a user touches the display region while gripping the body or bezel, the controller 440 displays the first effective region 1311 and the first non-effective region 1312.

Figure 14:
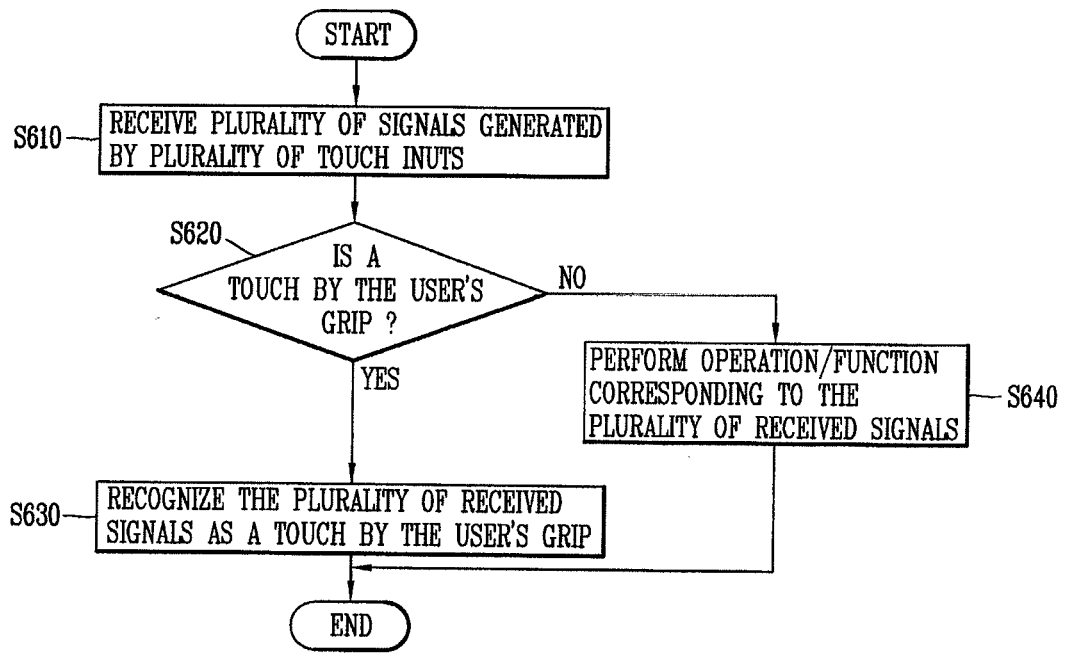
FIG. 14 is a flow chart showing a control method of a mobile terminal in accordance with a sixth embodiment of the present invention.

FIG. 14 is a flow chart showing a control method of a mobile terminal according to a sixth embodiment of the present invention.

First, the display unit 450 sequentially receives a plurality of signals generated by a plurality of touch inputs (or a plurality of user touch inputs) to any different locations of the display unit 450. At this time, the display unit 450 may be a touch screen. As an example, the display unit 450 receives a first signal, a second signal, and a third signal generated by a first touch input, a second touch input, and a third touch input to different locations of the display unit 450, respectively (S610).

Then, the controller 440 determines whether the plurality of received signals is a touch by the user's grip based on the plurality of received signals. In other words, the controller 440 determines whether information to any locations corresponding to the plurality of sequentially received signals, respectively, (for example, coordinate values corresponding to the plurality of received signals, respectively) corresponds to the sequence of predefined location information (for example, predefined coordinate values), and determines whether the received signals are a touch by the user's grip.

Figure 15:
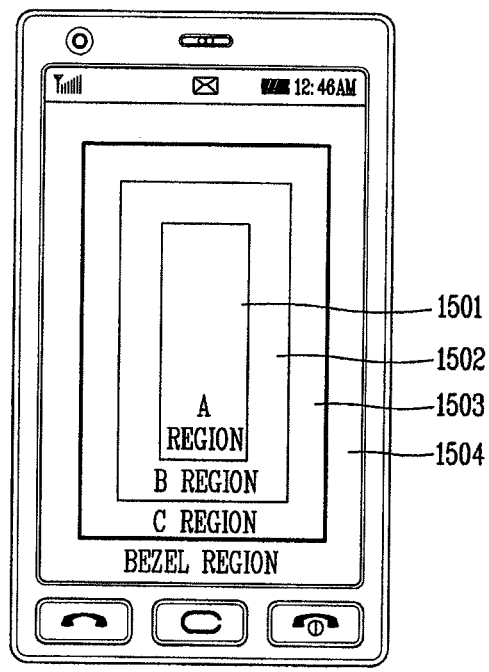
FIG. 15 is a view showing a screen of the display unit in accordance with one embodiment of the present invention.

As an example, as shown in FIG. 15, when the predefined location information includes location information corresponding to each touch sequence in the order of "region A 1501→region B 1502→region C 1503", "region A 1501→region C 1503→region B 1502", "region C 1503→region A 1501→region B 1502", and "region C 1503→region B 1502→region A 1501", the controller 440 determines whether the plurality of received signals, i.e., each location information corresponding to the sequentially received first signal, second signal, and third signal is included in the predefined location information (S620).

As a result of the determination, when the plurality of received signals are a touch by the user's grip, the controller 440 terminates a touch operation, and does not perform any function corresponding to the plurality of received signals. As an example, as shown in FIG. 15, when the received first signal, second signal, and third signal correspond to locations to the region B 1502, region C 1503, and region A 1501 (or locations to region B 1502, region A 1501, and region C 1503), respectively, in other words, a touch is detected in the sequence of region B 1502→region C 1503→region A 1501 (or region B 1502→region A 1501→region C 1503), and the sequence of the detected location information is not included in the sequences of the predefined location information, the controller 440 determines that a touch input by the sequentially detected location information is a touch input by the user's grip, thereby terminating an additional touch operation, and not performing any operation or function corresponding to the received signals (S630).

Furthermore, as a result of the determination, when the received signals are not a touch by the user's grip, the controller 440 performs a predefined operation or function corresponding to the sequentially inputted touch input (or the sequentially received plurality of signals). As an example, as shown in FIG. 15, when the received first signal, second signal, and third signal are detected in the order of region A 1501→region B 1502→region C 1503, respectively, and the sequence of the detected location information is included in the sequences of the predefined location information, the controller 440 performs a predefined function corresponding to the sequentially detected location information (S640).

Furthermore, if the sequentially received plurality of signals is performed consecutively more than a predetermined number of times, the controller 440 determines that the sequentially received plurality of signals is as an invalid touch action, and thus may not perform any operation or function corresponding to the plurality of received signals. In other words, if the sequence pattern of a touch input is performed consecutively more than a predetermined number of times, then the controller 440 determines that the sequence pattern is an invalid touch action, and thus may not perform any operation or function corresponding to the plurality of received signals.

In this manner, it may be possible to determine whether a sequence of signals is a touch by the user's grip by dividing a display region of the display unit 450 into a plurality of regions, and determining whether the sequence of signals is a touch input according to a predefined sequence based on the sequence of signals generated by touch inputs to the divided plurality of display regions.

Furthermore, in this manner, if a touch-enabled screen region is configured among the display regions of the display unit 450 for each application program and a touch input is received in a sequence corresponding to the preset display regions, then display unit 450 may be configured to perform a predefined function or operation.

In the example shown in FIG. 15, four regions (1501-1504) are shown. However, in other embodiments, more or less regions may be used to determine whether or not a grip is applied, leading to a termination of the additional touch operation. In another embodiment, one or more of the sequence of touches may be detected in a common region (e.g., two of the three touches may be in region 1503 or in a different region), leading to a termination of the additional touch operation.

In summary, according to a mobile terminal and a control method thereof according to an embodiment of the present invention, when a partial region of the display unit is touched by the user's grip on the display unit having a touch screen, the touch input is automatically recognized as a touch by the user's grip, thereby preventing any function/operation execution according to the user's wrong touch input.

In addition, according to a mobile terminal and a control method thereof according to an embodiment of the present invention, when any touch input is recognized as a touch by the user's grip, a specific region corresponding to the any touch input is configured as a non-effective region, and thus the user's habit (user's behavior of gripping a mobile terminal, etc.) is reflected therein, thereby preventing any function/operation execution according to the user's wrong touch input.

Moreover, according to a mobile terminal and a control method thereof according to an embodiment of the present invention, when a touch input with a predefined sequence to a plurality of divided display regions is received, or when a touch-enabled screen region is configured among the display regions for each application program and a touch input with a predefined sequence corresponding to the preset display regions is received, a predefined function or operation is carried out, thereby preventing unnecessary function/operation execution according to any touch input by determining the touch input as a touch input by the user's grip or unnecessary touch input except a touch input having a predefined sequence.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control method of a mobile terminal, the method comprising:
displaying screen information on a display unit of the mobile terminal;
detecting a first touch input on a predetermined area of the display unit while the screen information is displayed;
establishing an entire display region of the display unit as an effective region and a non-effective region based on a touch area of the first touch input within the predetermined area when the first touch input satisfies a predetermined condition; and
reconfiguring the effective region and the non-effective region based on a motion of the mobile terminal when the motion of the mobile terminal is detected, and the screen information is displayed on the entire display region of the display unit even if the effective region and the non-effective region are reconfigured,
wherein the establishing of the entire display region of the display unit as the effective region and the non-effective region comprises:
configuring a first region within the entire display region as the non-effective region, the non-effective region including the touch area where the first touch input is applied within the predetermined area;
configuring a second region within the entire display region as the effective region, the effective region excluding the non-effective region; and
displaying the screen information on the entire display region of the display unit without changing a size of the screen information after configuring the first region and the second region.

2. The method of claim 1, further comprising:
displaying an indication of a preset color on the non-effective region such that the effective region and the non-effective region are distinguished from each other in the screen information.

3. The method of claim 1, wherein the predetermined condition is that a touch duration of the first touch input exceeds a preset time.

4. The method of claim 1, wherein the non-effective region includes at least a side region of the entire display region adjacent to the touch area where the first touch input is applied.

5. The method of claim 1, wherein the display unit includes a touch screen.

6. A mobile terminal, comprising:
a display unit configured to display screen information and detect a first touch input on a predetermined area of the display unit while the screen information is displayed; and
a controller operatively connected to the display unit and configured to establish an entire display region of the display unit as an effective region and a non-effective region based on a touch area of the first touch input within the predetermined area when the first touch input satisfies a predetermined condition, and configured to reconfigure the effective region and the non-effective region based on a motion of the mobile terminal when the motion of the mobile terminal is detected, the screen information being displayed on the entire display region of the display unit even if the effective region and the non-effective region are reconfigured,
wherein the controller is further configured to establish the effective region and the non-effective region by:
configuring a first region within the entire display region as the non-effective region, the non-effective region including the touch area where the first touch input is applied within the predetermined area;
configuring a second region within the entire display region as the effective region, the effective region excluding the non-effective region; and
displaying the screen information on the entire display region of the display unit without changing a size of the screen information after configuring the first region and the second region.

7. The mobile terminal of claim 6, wherein the controller is further configured to display an indication of a preset color on the non-effective region such that the effective region and the non-effective region are distinguished from each other in the screen information.

8. The mobile terminal of claim 6, wherein the predetermined condition is that a touch duration of the first touch input exceeds a preset time.

9. The mobile terminal of claim 6, wherein the non-effective region includes at least a side region of the entire display region adjacent to the touch area where the first touch input is applied.

10. The mobile terminal of claim 6, wherein the display unit includes a touch screen.

* * * * *